US009680886B2

(12) United States Patent
Arunachalam et al.

(10) Patent No.: US 9,680,886 B2
(45) Date of Patent: Jun. 13, 2017

(54) INTERNET ENABLED UNIVERSAL REMOTE CONTROL SYSTEM

(71) Applicant: Peel Technologies, Inc., Mountain View, CA (US)

(72) Inventors: Thirumalai Arunachalam, Santa Clara, CA (US); Balamurugan Krishnan, Daly City, CA (US); Hong Wu, San Jose, CA (US); Leslie Andrew Prock, Edgewood, WA (US); Gregory Charles Lindley, Sunnyvale, CA (US); Sivasubramanian Muthukumarasamy, Santa Clara, CA (US); Christopher Steven Lock, Scotts Valley, CA (US); Avinash Shetty, San Jose, CA (US)

(73) Assignee: Peel Technologies, Inc., Mountain View, CA (US)

( * ) Notice: Subject to any disclaimer, the term of this patent is extended or adjusted under 35 U.S.C. 154(b) by 111 days.

(21) Appl. No.: 14/052,662

(22) Filed: Oct. 11, 2013

(65) Prior Publication Data
US 2014/0143336 A1   May 22, 2014

Related U.S. Application Data

(63) Continuation-in-part of application No. 12/728,670, filed on Mar. 22, 2010.
(Continued)

(51) Int. Cl.
*G06F 15/16* (2006.01)
*H04M 1/00* (2006.01)
(Continued)

(52) U.S. Cl.
CPC ...... *H04L 65/403* (2013.01); *G06F 17/30058* (2013.01); *H04N 5/44543* (2013.01);
(Continued)

(58) Field of Classification Search
CPC ......... H04N 21/4826; H04N 21/44222; H04N 21/4126; H04N 21/47202; H04N 21/44213; H04N 21/436; H04L 67/025
(Continued)

(56) References Cited

U.S. PATENT DOCUMENTS 6,914,551 B2   7/2005   Vidal
6,938,101 B2   8/2005   Hayes et al.
(Continued)

FOREIGN PATENT DOCUMENTS

CN   101061713 A   10/2007
CN   100352280 C   11/2007
(Continued)

OTHER PUBLICATIONS

European Patent Office, Supplementary Partial European Search Report and Opinion, European Patent Application No. EP 10754224.3, Mar. 14, 2013, six pages.
(Continued)

*Primary Examiner* — Phuoc Nguyen
*Assistant Examiner* — Kishin G Belani
(74) *Attorney, Agent, or Firm* — Fenwick & West LLP

(57) ABSTRACT

A Device-Based Control System (DBCS) enables a device-agnostic and source-agnostic entertainment experience through use of an internet-enabled device (IED). The IED includes a media management application for navigating through media or entertainment content, controlling media devices according to a type of media content selected by the user, and sharing media experiences via social networks. The IED includes smartphones, tablet computers, and other internet-enabled processor-based devices. The DBCS leverages the internet access of the IED to enable search and discovery of all available media content. A content recommendation system (CRS) coupled to the media management
(Continued)

application learns media preferences from user behavior, generates from numerous disparate media sources media choices corresponding to the media preferences, and presents the media choices on the IED.

18 Claims, 35 Drawing Sheets

Related U.S. Application Data

(60) Provisional application No. 61/712,786, filed on Oct. 11, 2012.

(51) Int. Cl.

| | |
|---|---|
| *G05B 11/01* | (2006.01) |
| *G06F 13/00* | (2006.01) |
| *H04L 29/06* | (2006.01) |
| *H04N 5/445* | (2011.01) |
| *H04N 21/231* | (2011.01) |
| *H04N 21/25* | (2011.01) |
| *H04N 21/258* | (2011.01) |
| *H04N 21/2665* | (2011.01) |
| *H04N 21/2668* | (2011.01) |
| *H04N 21/414* | (2011.01) |
| *H04N 21/422* | (2011.01) |
| *H04N 21/4227* | (2011.01) |
| *H04N 21/436* | (2011.01) |
| *H04N 21/4363* | (2011.01) |
| *H04N 21/442* | (2011.01) |
| *H04N 21/4788* | (2011.01) |
| *H04N 21/482* | (2011.01) |
| *H04N 21/61* | (2011.01) |
| *H04N 21/658* | (2011.01) |
| *H04N 21/81* | (2011.01) |
| *G06F 17/30* | (2006.01) |
| *H04N 5/58* | (2006.01) |
| *H04N 21/472* | (2011.01) |
| *H04N 5/44* | (2011.01) |

(52) U.S. Cl.
CPC ..... *H04N 21/23109* (2013.01); *H04N 21/251* (2013.01); *H04N 21/252* (2013.01); *H04N 21/25808* (2013.01); *H04N 21/25891* (2013.01); *H04N 21/2665* (2013.01); *H04N 21/2668* (2013.01); *H04N 21/41407* (2013.01); *H04N 21/4222* (2013.01); *H04N 21/4227* (2013.01); *H04N 21/42209* (2013.01); *H04N 21/42224* (2013.01); *H04N 21/436* (2013.01); *H04N 21/43637* (2013.01); *H04N 21/44222* (2013.01); *H04N 21/4788* (2013.01); *H04N 21/4826* (2013.01); *H04N 21/6125* (2013.01); *H04N 21/6175* (2013.01); *H04N 21/6582* (2013.01); *H04N 21/8173* (2013.01); *H04N 5/58* (2013.01); *H04N 21/47217* (2013.01); *H04N 2005/443* (2013.01)

(58) Field of Classification Search
USPC .......................................................... 709/204
See application file for complete search history.

(56) References Cited

U.S. PATENT DOCUMENTS

| | | | |
|---|---|---|---|
| 7,218,243 | B2 | 5/2007 | Hayes et al. |
| 7,230,563 | B2 | 6/2007 | Vidal |
| 7,589,642 | B1 | 9/2009 | Mui |
| 7,831,930 | B2 | 11/2010 | Dresti et al. |
| 7,889,112 | B1 | 2/2011 | Vergis et al. |
| 8,054,211 | B2 | 11/2011 | Vidal |
| 2002/0151327 | A1* | 10/2002 | Levitt ........................... 455/556 |
| 2003/0126600 | A1 | 7/2003 | Heuvelman |
| 2005/0096753 | A1* | 5/2005 | Arling .................... G05B 15/02 700/11 |
| 2006/0259852 | A1 | 11/2006 | Upendran et al. |
| 2007/0288470 | A1* | 12/2007 | Kauniskangas et al. ....... 707/10 |
| 2008/0301737 | A1* | 12/2008 | Hjelmeland Almas et al. ............................. 725/61 |
| 2009/0119169 | A1 | 5/2009 | Chandratillake et al. |
| 2012/0019371 | A1 | 1/2012 | Vidal |

FOREIGN PATENT DOCUMENTS

| | | |
|---|---|---|
| CN | 101094372 A | 12/2007 |
| CN | 101141607 A | 3/2008 |
| CN | 101334792 A | 12/2008 |

OTHER PUBLICATIONS

PCT International Preliminary Report on Patentability, PCT Application No. PCT/US2010/028125, Sep. 20, 2011, one page.
PCT International Search Report and Written Opinion, PCT Application No. PCT/US2010/028125, May 4, 2010, two pages.
State Intellectual Property Office of the People's Republic of China, First Office Action, Chinese Patent Application No. 201080019094.7, Jan. 16, 2014, twenty-one pages.
United States Office Action, U.S. Appl. No. 12/728,670, Jan. 3, 2014, eleven pages.
United States Office Action, U.S. Appl. No. 12/728,670, Nov. 28, 2014, thirteen pages.
United States Office Action, U.S. Appl. No. 12/728,670, Jul. 22, 2015, fifteen pages.
United States Office Action, U.S. Appl. No. 12/728,670, Oct. 4, 2016, 19 pages.

* cited by examiner

10' Experience, Eyes on the TV, Until Viewer Presses Search Button

| Gesture | | Watching Live TV | Watching DVR | Watching DVR/Blu-ray/Sky/VCR | Onscreen Browsing UI For TV: Guide/DVD/DVR/Blu-ray/Sky |
|---|---|---|---|---|---|
| ↑ | Up | Volume Up | Volume Up | Volume Up | Move Selection/Cursor Up |
| ⇑ | Continuous Up | Continuous Volume Up | Continuous Volume Up | Continuous Volume Up | Cont. Move Selection/Cursor Up Page Up |
| ↓ | Down | Volume Down | Volume Down | Volume Down | Move Selection/Cursor Down |
| ⇓ | Continuous Down | Continuous Volume Down | Continuous Volume Down | Continuous Volume Down | Cont. Move Selection/Cursor Down Page Down |
| ← | Left | Channel Down | Enter Rewind Mode | Enter Rewind Mode | Move Selection/Cursor Left |
| ⇐ | Continuous Left | Continuous Channel Down | Scrub Back While Finger Down | Scrub Back While Finger Down | Cont. Move Selection/Cursor Left Page Left |
| → | Right | Channel Up | Enter Fast Forward Mode | Enter Fast Forward Mode | Move Selection/Cursor Right |
| ⇒ | Continuous Right | Continuous Channel Up | Scrub Forward While Finger Down | Scrub Forward While Finger Down | Cont. Move Selection/Cursor Right Page Right |
| ↻ | Clockwise | Back in Channel History | Jump Back 10 Seconds | Jump Back 10 Seconds/Prev. Chapter | Previous Screen |
| ↺ | Counter Clockwise | Forward in Channel History | Jump Forward 30 Seconds | Jump Forward 30 Seconds/Next Chapter | Next Screen |
| ○ | Select | Mute | Play/Pause | Play/Pause | Select |
| ◎ | Menu | TV Menu | DVR Menu | DVR Menu | Menu Up/Previous |
| ● | Content Required Contextual Menu | N/A | Show Info | Contextual Menu | Contextual Menu |
| ⌕ | Search (Button) | Search UI & Keyboard on Device; Scoped to TV Guide | Search UI & Keyboard on Device; Scoped to DVR Content | Search UI & Keyboard on Device; Scoped to Universal Search | Search UI & Keyboard on Device; Scoped to Appropriate Service |
| ✕ | Switch Context to 2' (Button) | Switch from 10' Experience to 2' Experience | | | |

FIG. 5

2' Experience, Eyes on the Device

| Gesture | Watching Live TV | Watching DVR | Watching DVR/Blu-ray/Sky/VCR | Onscreen Browsing UI For TV: Guide/DVR/DVD/Blu-ray/Sky |
|---|---|---|---|---|
| ▶‖ Play/Pause | N/A - Mute button instead | Play/Pause | Play/Pause | N/A |
| ⏮ Previous/Rewind | Channel Down | Jump Back 10 Seconds | Jump 10 Seconds/Prev. Chapter | N/A |
| ⏭ Next/FastForward | Channel Up | Jump Forward 30 Seconds | Jump 30 Seconds/Next Chapter | N/A |
| ⎯○⎯ Volume Slider | Volume Up/Down | | | N/A |
| ⊙ Info | Shows info about currently playing content | | | N/A |
| ↻ Share | Share through Facebook, Twitter, and Mail. Includes recommendations or text blurb. | | | N/A |
| ✱ Advanced Remote | Shows comprehensive remote with infrequently used buttons/functions. Contextual for whatever device(s) are | | | N/A |
| Date Date/Time Picker | N/A | | | Show UI for viewing content for a specific date and time |
| < > Page Guide Left/Right | N/A | | | Page to previous/next time slot |
| ○ Select | N/A | | | Play show, or show info if content is not live |

FIG. 6A

| | | |
|---|---|---|
| ☰ Scroll Up/Down (Gesture) | N/A | Scroll guide up/down |
| ⇔ Swipe Left/Right (Gesture) | N/A | Reveal inline UI for Play/Record/Alarm, Info, Share, Like, Dislike |
| ▶●◉ Play, record, or alarm | N/A | Play, if Live, Record if DVR, Alarm if no DVR |
| ⓘ Info | N/A | Show info about selected content |
| ↺ Share | N/A | Share through Facebook, Twitter, and Mail. Includes rec, or message |
| ✓ Like | N/A | Like it! |
| ✗ Dislike | N/A | Dislike it! |
| 🔍 Search | Search UI & Keyboard: Scoped to service in selected tab | |
| ⧖ Switch Context to 10' | Switch from 2' Experience to 10' Experience | |
| ☐ Tabs | Search between browsing of difference services, TV Guide, DVR, Sky Services, etc... | |

FIG. 6B

Different Fruit for Each Room

| FIG. 15B | FIG. 15C | FIG. 15D |
|---|---|---|
|  | FIG. 15E | FIG. 15F |
|  | FIG. 15G | FIG. 15H |
|  | FIG. 15I | FIG. 15J |
|  | FIG. 15K | FIG. 15L |

| Command | Result |
|---|---|
| Go to webpage with given URL | ZRCIBS loads and displays the webpage that is present at the given internet URL |
| While on webpage, Navigate: Up/down/right/left (This is done via button presses or gestures on the Zelfy application) | ZRCIBS jumps hyperlink to next hyperlink. |
| Play video at given URL | ZRCIBS plays the video present at the given URL |
| Execute Transport Command (Play, Pause Fastforward, rewind) on currently playing video | ZRCIBS executes the transport command on the current playing video. |
| Play audio at given URL | ZRCIBS plays the audio present at the given URL |
| Execute Transport Command (Play, Pause Fastforward, rewind) on currently playing audio | ZRCIBS executes the transport command on the current playing audio. |
| Play flash swf game or other game at given URL | ZRCIBS loads and presents the game (adobe flash swf of other) present at the given URL |
| While on game: Pass game command. (This is done via button presses or gestures on the Zelfy application) | ZIMMS executes the command in the game. |
| Play video with given video-id (as specified by 3$^{rd}$ party using 3$^{rd}$ party APIs and Video Players | ZRCIBS loads the 3$^{rd}$ Party Video Player specified and plays the video with given videoid) |
| Play audio with given audio-id (as specified by 3$^{rd}$ party using 3$^{rd}$ party APIs and audio Players | ZRCIBS loads the 3$^{rd}$ Party Audio Player specified and plays the audio with given audioid) |

FIG.19

INTERNET ENABLED UNIVERSAL REMOTE CONTROL SYSTEM

CROSS REFERENCE TO RELATED APPLICATIONS

This application claims priority to U.S. Provisional Application No. 61/712,786 and is a continuation-in-part of co-pending U.S. application Ser. No. 12/728,670, both of which are incorporated by reference herein in their entirety.

BACKGROUND

This disclosure relates generally to control of electronic media devices and content. More particularly, the embodiments described herein relate to use of an internet-enabled device to control navigation through media or entertainment content and control media devices or components.

Consumers have two levels of complexity to deal with in their premises (e.g., homes, offices, etc.). A first complexity deals with managing and controlling various electronic components or equipment in the premises (e.g., audio components, video components, digital video recorders (DVRs), digital video players, etc.). The conventional solution to this problem has been the universal remote that allows a consumer to control more than one component with a single remote.

A second complexity is that the consumer currently has no way to interactively research/browse through the plethora of content choices that are available for them to watch and/or listen to from numerous sources at any particular moment. Consumers of content are faced with the ever increasing dilemma of finding content to watch that matches their desires and needs. Given that most consumers now have access to a plethora of channels, the current approach of using an Electronic Program Guide (EPG) to search for TV content is not a satisfactory approach and most consumers confine their viewing to a limited subset of channels. When content from IPTV and other internet sources are included this approach fails completely. Furthermore, the use of search assumes that the user knows what they are searching for, and works well under that assumption. However, in many, if not most, circumstances the user does not have a specific piece of content that they wish to search for and watch.

SUMMARY

An integrated internet enabled device (IED) such as a Laptop, Smartphone, Tablet and other computers, provides a platform for configuration a universal remote control system to provide a content driven experience for content discovery, select-to-play, and device control functionality.

A device-based control system (DBCS) enables a one-touch media selection of content available from multiple media platforms (e.g., online services, cable, satellite, physical media, etc.) for presenting the media through the coordination of the plurality of media presentation (e.g., audio, video, etc.) display devices. Embodiments include integrating the following in a smartphone or tablet: Electronic circuitry, components, firmware and device drivers to send and receive IR signals to control home electronic devices.

A software application that provides a Content Driven User Experience (where the users see digital images of the show and movie posters on the screen) to help the user discover content, which can then be selected (via single touch/tap, or a sequence of touch/tap or via non touch interface using pointers, roller-balls, arrow keys etc) to fire appropriate control codes (via IR signals, via IP on home network (wired/wireless) and/or the internet, either individually or as a hybrid combination to control the home entertainment devices to play the selected piece of content. The content driven experience can also be further enhanced by filtering and ordering content via a content recommendation system.

BRIEF DESCRIPTION OF THE DRAWINGS

FIG. 5 is a table that is a first example mapping ("Eyes on the TV, Until Viewer Presses Search Button") of context based on actions mapped to user actions, under an embodiment.

FIGS. 6A and 6B illustrate a table that is a second example mapping ("Eyes on the Device") of context based on actions mapped to user actions, under an embodiment.

FIG. 19 is a table of commands generated by the IED and the resulting action or operation by the RCIBS in response to the command, under an embodiment.

Figure 1A:
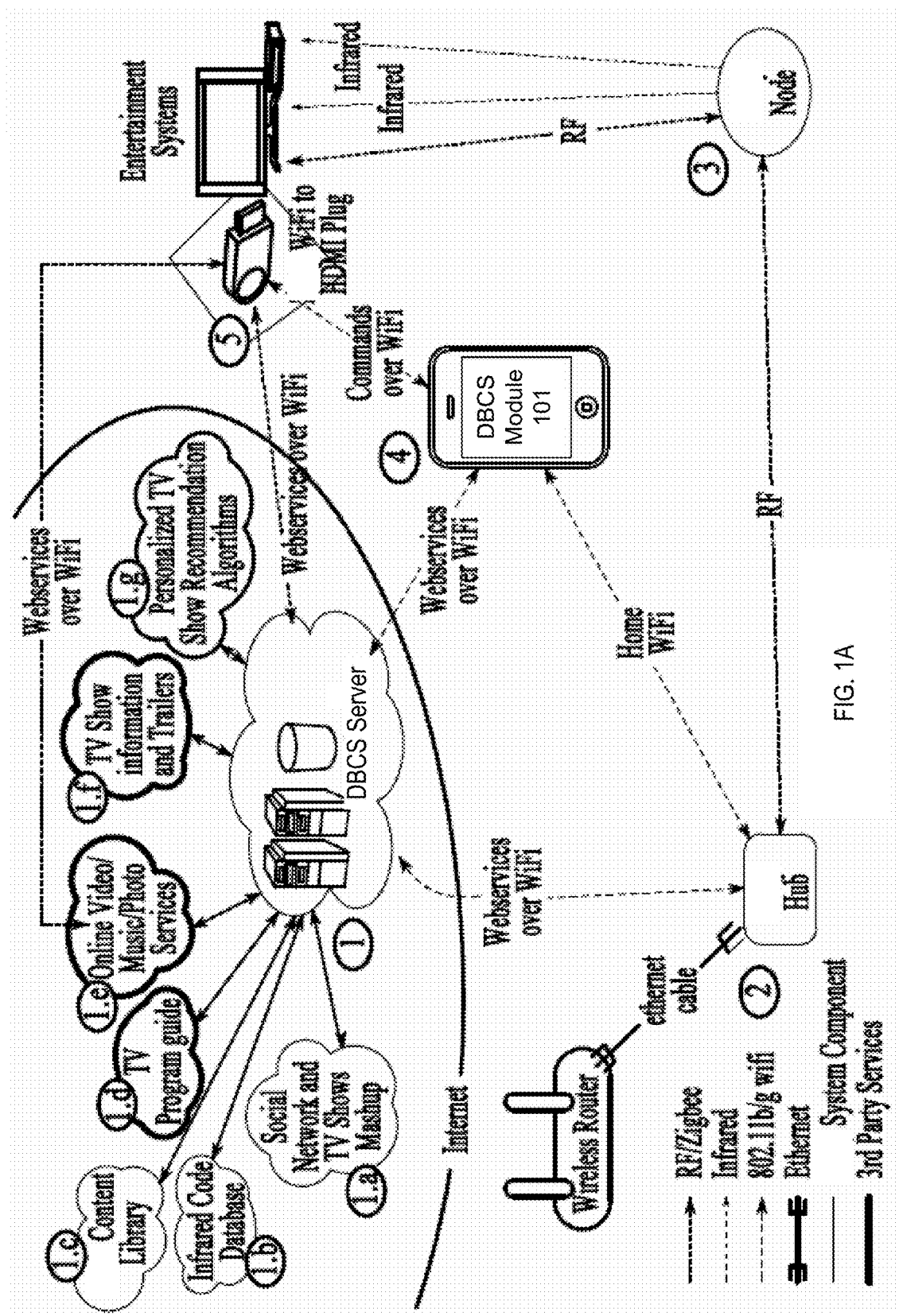
FIGS. 1A and 1B illustrate example embodiments of a Device-Based Control System (DBCS).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A Device-Based Control System (DBCS) is described that enables consumers, through the use of an internet-enabled device (IED), to navigate through media or entertainment content, control media components or equipment to watch and/or listen to media content, and share their media experiences with an internet community or social network. The internet-enabled devices of an embodiment include any processor-based device with internet connectivity, a screen, and a means to navigate controls on the screen, for example, smartphones, tablet computers, touch-enabled devices (e.g., iPhone®, iPod®, iPad®, etc.), personal computers (PCs), digital photo frames, and other internet-enabled processor-based client or remote devices. The DBCS leverages the internet access of the IEDs to enable search and discovery of all available media content.

The DBCS overcomes the complexities described above to provide consumers with direct access to media content choices that are available for them in a user-friendly way on IEDs. Thus, the DBCS, using a combination of premise hardware, a software system, and/or internet access, allows consumers to select and control media content via their internet-enabled device. The DBCS changes the way consumers select media and how they control that media across their entertainment components or devices and, as such, enables a device-agnostic and source-agnostic entertainment experience.

The following terms can have the following general meanings as they are used herein, but can also have meanings attributed to them by one skilled in the art.

"Touch-handheld" or "Touch-Enabled Device" is any device that has a touch screen and can be interacted with in a mobile form. For example, devices like the iPhone®, iPod®, iPad®, and/or Nexus® Phone are touch-handheld devices.

"Content Source" is a source from which a specific piece of content is made available (e.g., broadcast, cable, over the air, online, digital video disk (DVD), video on demand (VOD), etc.).

"Input" refers to various input ports on a component such as a television (TV), audio/video (AV) receiver, and the like (e.g., HDMI1 port, Component 1 port, etc.).

"zHub" is a hardware component that converts Ethernet signals to radio frequency (RF) signals.

"zNode" is a hardware component that converts RF signals to infrared (IR) signals.

"Cloud" is an Internet server-based software and data.

"Device/Equipment" is entertainment components or devices such as TV, DVD player, Apple TV device, to name a few.

"Router" is an Internet switch that is coupled or connected to an internet cable or digital subscriber link (DSL) modem and enables a home network that is shared by one or more internet protocol (IP)-based devices (e.g., personal computer (PC), WiFi devices, etc.) in the home.

"IR Code" is an infrared code used to control or perform a specific action on a component or piece of equipment.

"RF" is a radio frequency signal used to wirelessly communicate between the zHub and the zNode.

"Program Guide" is a collection of metadata corresponding to available media content (e.g., TV programs, audio programs, etc.). Examples include, but are not limited to, electronic TV guides or electronic program guides, for instance.

"Online Media" is Internet-based media content.

"Content Recommendation System (CRS)" is the system that provides content or other program recommendations based on user behavior.

"Gesture" is a touch-based and/or movement-based interaction with an interface device or an interface of a device (e.g., swipe right, swipe left, tap, move right, move left, shake, etc.).

Example System Environments

FIG. 1A is a block diagram of the Device-Based Control System (DBCS), under an embodiment. The DBCS of an embodiment comprises a hub 2, referred to herein as the zHub 2, a node 3, referred to herein as the zNode 3, and an DBCS module 101 that executes on a processor of the internet-enabled device (IED) 4 with which the consumer interacts. The zHub 2 comprises a hardware component that receives signals or commands from the IED 4 via a local or premise network (e.g., router, WiFi, etc.) and translates the commands to RF signals. The zNode 3 comprises a hardware component that receives RF signals from the zHub 2 and translates the RF signals to a protocol (e.g. Infrared) interpretable by the media components. The zHub 2 and zNodes 3 present at a premise can be referred to herein as a media control network, but are not so limited. The DBCS module 101 that runs or is hosted on the IED 4 can be referred to herein as a media management application, but is not so limited.

The DBCS of an example embodiment comprises a Content Index Database (CID) 1C, also referred to as content library 1C, hosted on an internet server 1, which manages electronic program guide information. The DBCS comprises a device map and infrared database 1B, hosted on the internet server 1, used in the management of media components at the premise. The DBCS comprises a recommendation algorithm 1G, hosted on an internet server 1, which suggests media content to a consumer based on consumer behavior. The recommendation algorithm can be referred to herein as a Content Recommendation System (CRS), but is not so limited. The DBCS comprises or forms a social platform 1A that manages the consumer's social experience around media content. The DBCS may comprise a zHDStick that streams internet content over WiFi to High Definition television (HDTV). The DBCS comprises a zSky software agent that helps manage online media viewing on TV; the zSky agent can be hosted (e.g., preinstalled) on the zHDStick, or can be independently installed on a media PC, but the embodiment is not so limited. The DBCS also comprises a TV program guide 1D, online video/music/photo services 1E, and/or TV show information and trailers 1F. The components of the DBCS are described in detail below.

The DBCS module 101 executes on a processor of the IED with which the consumer interacts. When the consumer uses the IED, he interacts primarily with the DBCS module 101 to manage the home entertainment experience.

The DBCS module 101 offers, through content-based navigation, content choices as its primary form of interface, where the content choices are tailored to an individual consumer's preference. The content choices are categorized using easy to understand genres that the consumer can quickly browse through to select content. The content choices are aggregated from a multitude of sources, for example, subscription media, broadcast media, cable, DVR, VOD and internet media to which the consumer has access.

Generally, the DBCS is a system comprising a media control network coupled to the internet via a local network of a premise. The DBCS module 101 running on an internet-enabled device (IED) and controlling media devices at the premise via the media control network. The DBCS comprises a Content Recommendation System (CRS) hosted on the internet server 1 and coupled to the DBCS module 101. The CRS determines media preferences from user behavior, generates, from a plurality of disparate media sources available to the user given the entertainment systems within their premises, media choices corresponding to the media preferences, and transmits the media choices to the DBCS module 101 for presentation on the IED. The DBCS module 101, utilizing a command packet generated according to the user's entertainment systems for each media content choice, automatically controls delivery and presentation of the selected media content at the user premise.

Figure 1B:
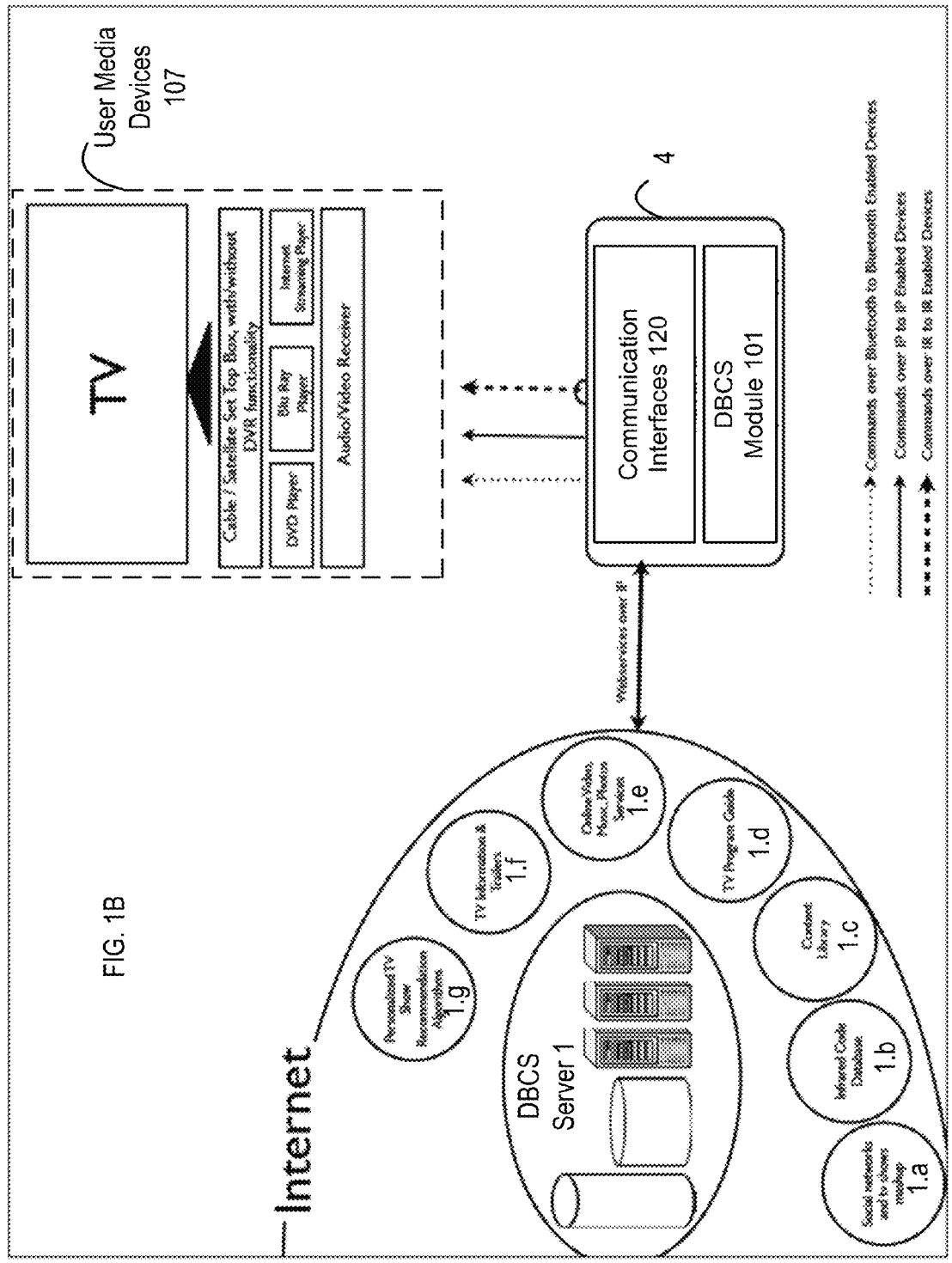

FIG. 1B is a block diagram of the Device-Based Control System (DBCS), under another example embodiment. Referring to FIG. 1B, various components from FIG. 1A are consolidated in the IED 4. The server system 1 provides the various webservices to transmit available multi-source content to the DBCS module 101 depending on which sources the user has access to and what the content recommendation system generates as recommendations for the user. Specifically, the server system 1 supports content recommendations, content browsing, content categorization based on genres, content search, and social discovery of content. For example, the DBCS server system 1 may determine content recommendations by scanning a graph associated with a social network of the user and/or monitoring general trends on the social network to determine shows popular with users having a particular set of interests.

The DBCS server system 1 may store the configuration of the media devices 107 in association with a profile of the user. Using the configuration of the media devices 107, the DBCS server 1 may determine the sequence of commands that the IED 4 should issue to the media devices 107 in order to begin the presentation of a content choice selected on the IED 4.

Figure 22:
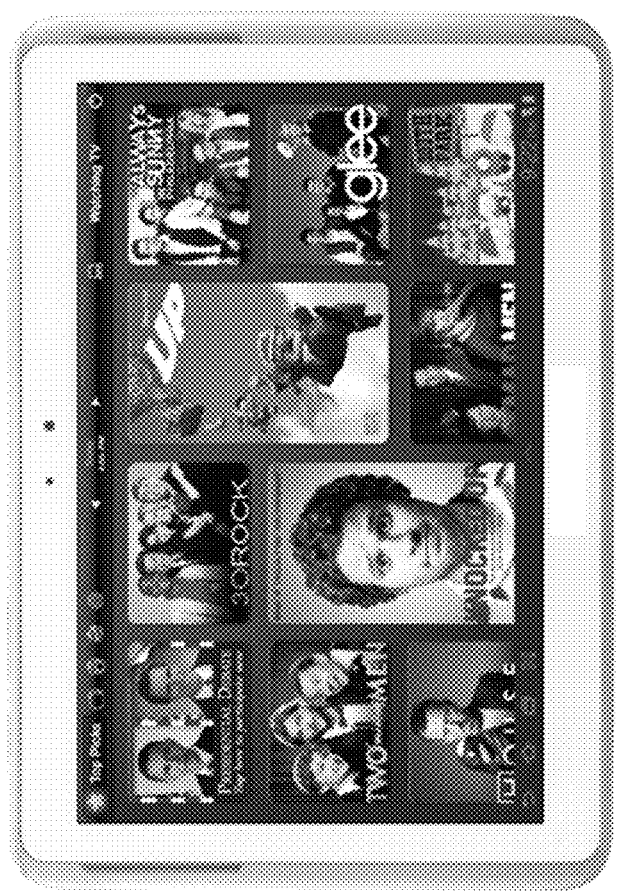
FIGS. 22-24 illustrate example interfaces for controlling and selecting content on the IED for presentation on a user entertainment system.

The DBCS module 101 displays the content recommendations organized based on content browsing habits, content categorization based on genres, content search, and social discovery of content. Additionally, the DBCS module 101 may provide a list of top picks or recommendations that span the breadth of recommended content sources. An example top picks interface 2200 is illustrated in FIG. 22. As shown, the DBCS module 101 may present media choices in a source agnostic format to integrate the availability of content across multiple sources of content—for example: live broadcast TV, recorded content on DVR, online video content from subscription services like Netflix, free streaming sources such as Hulu, or purchase based systems like iTunes. The DBCS server 1 may rank content according to determined user preference and, in turn, the DBCS module 101 may display the higher ranked content earlier in the list. The top picks list may include further sub-lists within each content genre such that the user may navigate and browse to find content that he or she likes. Social networking connections of the user and content determined by the DBCS server 1 may be communicated together to the DBCS module 101.

In turn, the DBCS module 101 may include a social feature that presents an interface identifying the connection between the user and other users having interacted with a particular content choice. Thus, for example, the user may see that a connection (e.g., friend) in the social network viewed and recommended the content or whether a large number of social networking users have recommended a particular content choice.

Figure 23:
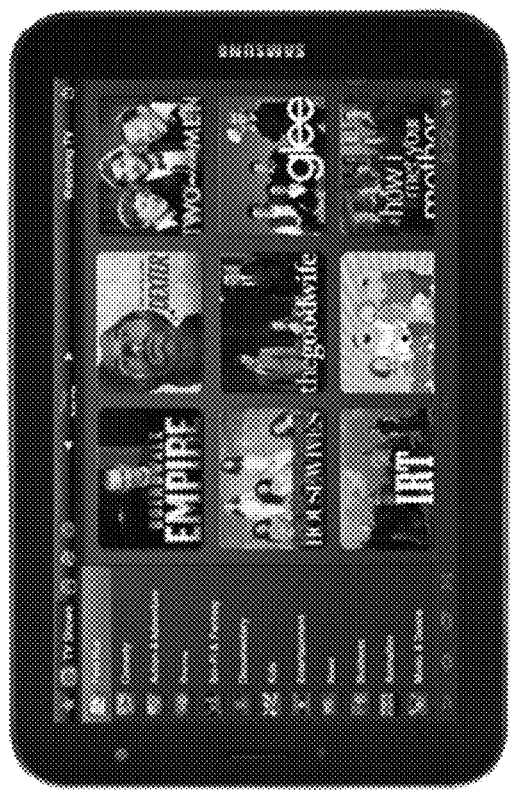

Other views may integrate selections according to the original source. For example, FIG. 23 illustrates an interface view 2300 that displays content according to the original source (e.g., television shows), but the media content itself may be provided from any one of the user's media sources from which it is available.

Referring to the IED 4 in greater detail, the IED includes a communications interface 120 which enables the DBCS module 101 to execute a series of commands or command packet (that could be a combination of commands utilizing IR, IP or BT interfaces) to control the user media device 107 present at the user premise. The DBCS module 101 may receive command packets from the server system 1 generated according to the user's entertainment systems for each media content choice, or generate the command packet locally. For example, as the user premise may include multiple grouping of devices 107 across different rooms, the DBCS module 101 and/or server system 1 may make a determination as to which commands should be issued, and an ordering of the commands, in the command packet based on user location within the premise.

The DBCS module 101 may monitor the current states of media devices 107 at the user premises. The states may optionally be transmitted to the DBCS server 1. Depending on the states of the media devices 107, the commands in the command packet may be altered to ensure that the proper sequence of commands is transmitted to each device. For example, if a particular device is in the off state, the on command would need to be transmitted prior to another command. Alternatively, if the device is in the on state, no turn on command should be transmitted to the device. By monitoring the state of each media device 107, the sequence of commands may be altered to ensure the desired final state of the device 107 for presenting the users media content choice is reached.

Figure 20:
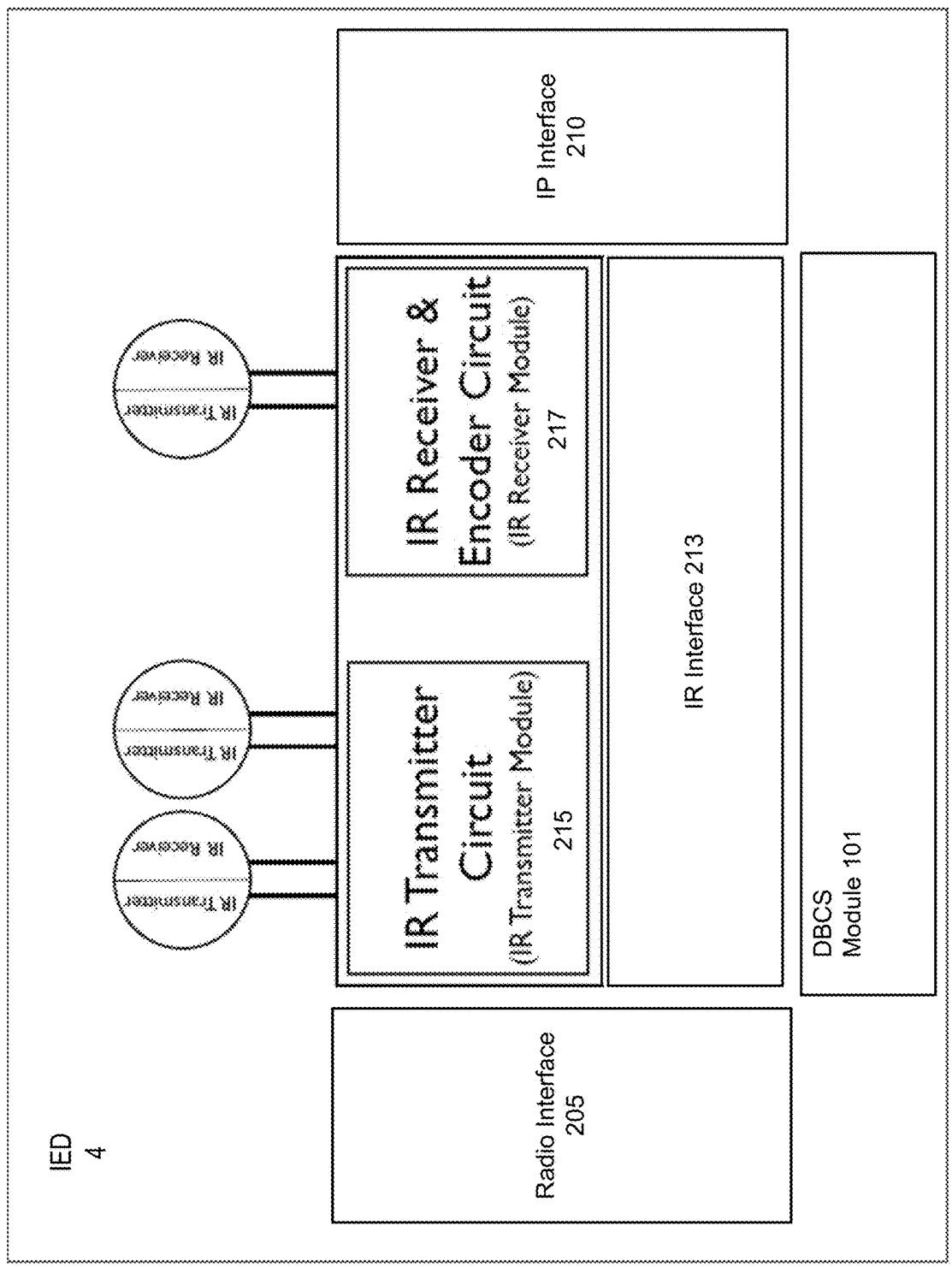
FIG. 20 illustrates an example embodiment of a control system, interface and hardware on an IED.

Now referring to FIG. 20, the IED 4 may include interfaces 120 for IR 213, IP 210, and radio 205 communications. Radio communications may include BT and WiFi communications (using IP protocol through the IP interface 210). Each interface 205, 210, 213 may include the necessary transmit and receive hardware, firmware and any device drivers to enable the DBCS module 101 to execute a command packet for communicating the media device 107. For example, IR transmit 215 is used to send the IR control signals to one or more use media devices 107 while the IR Receiver may be used to capture IR Signals from a regular remote control or receive feedback from a media device 107. The DBCS module 101 may use the captured signals from the remote control and feedback to monitor the state of the media devices 107. Additionally, the capture ability of the receiver 217 may enable the user to teach the DBCS module 101 and/or DBCS server 1 an unknown IR code or to identify the set of IR codes compatible with the user media device 107

Once the user has decided on a piece of content to watch, the user may simply select the content via the interface provided by the DBCS module 101 which, in turn, utilizes the various interfaces of the IED 4 to issue the commands in the command packet to the user media devices 107 necessary to display the selected content choice. The command packet contains required information that each interface uses to generate, execute and hence control the entertainment devices such that user's selected piece of content is presented utilizing and number of the user media devices 107.

Figure 2:
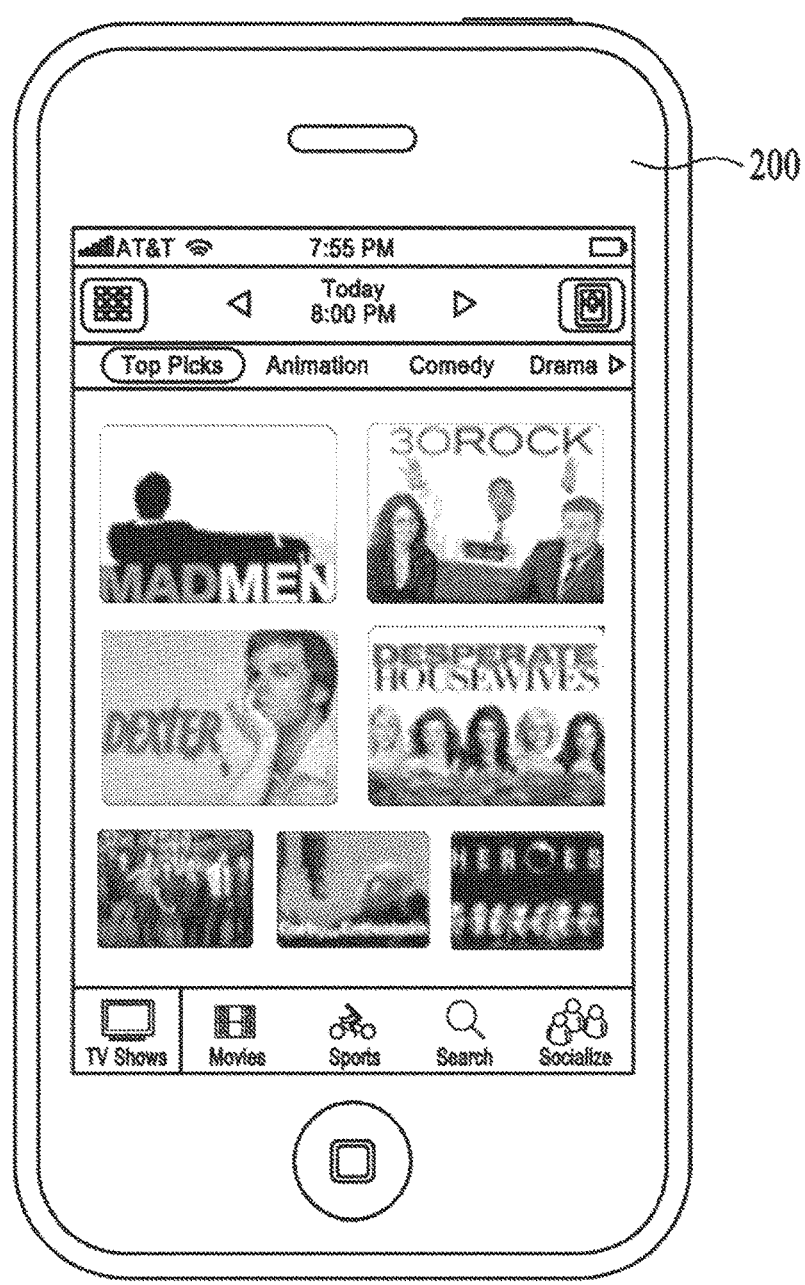
FIG. 2 is a first example screenshot presented on the IED showing content-based navigation, under an embodiment.
Figure 3:
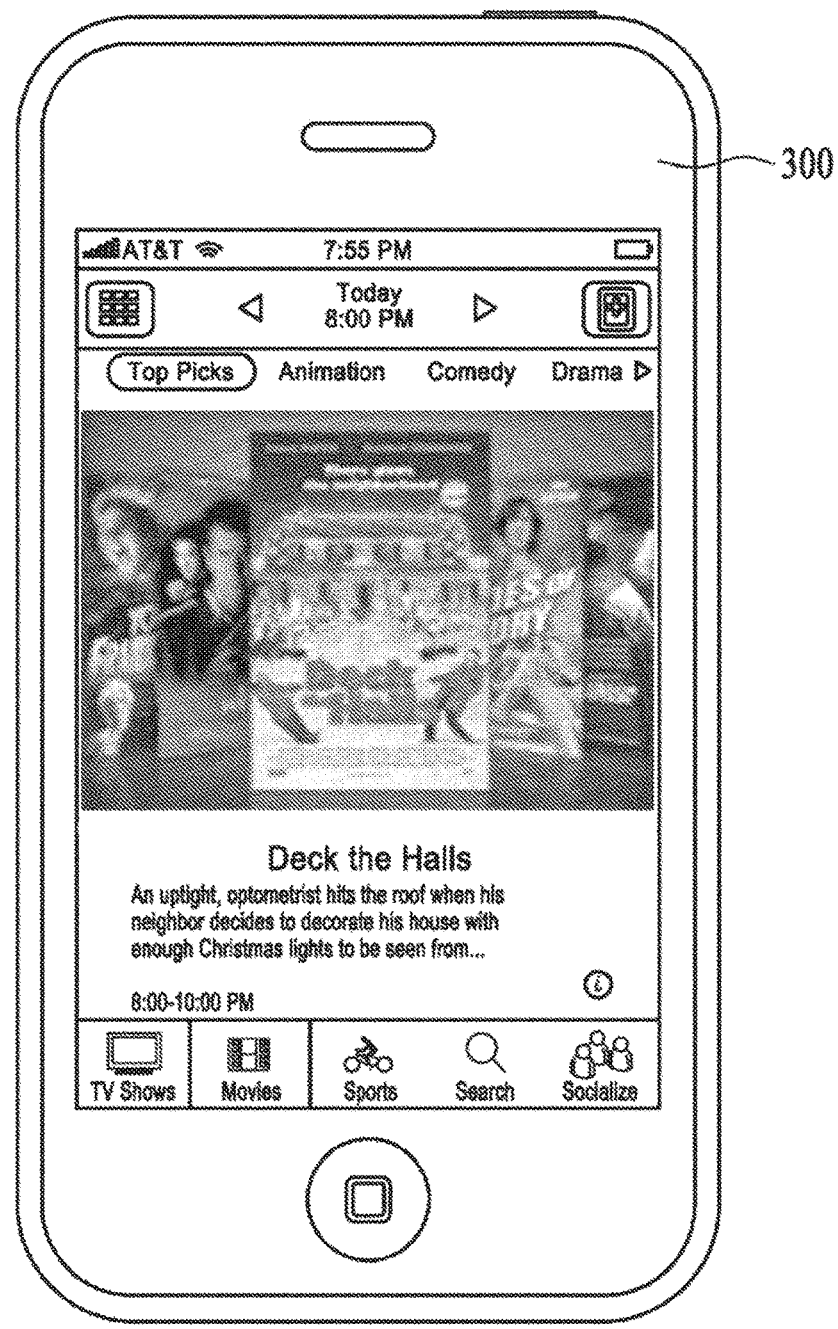
FIG. 3 is a second example screenshot presented on the IED showing content-based navigation, under an embodiment.

FIG. 2 is a first example screenshot 200 showing content-based navigation, under an embodiment. This example screenshot 200 includes "Top Pick" recommendations (in the category of "TV Shows") generated and presented by the CRS via the IED. FIG. 3 is a second example screenshot 300 showing content-based navigation, under an embodiment. This example screenshot 300 includes "Top Pick" recommendations (in the category of "Movies") generated and presented by the CRS via the IED. These examples 200/300 are shown as examples on the iPhone®, from Apple®, Inc., but the embodiments herein are not limited to the iPhone® and can be used with any processor-based IED. The DBCS software causes personalized content choices to be presented on a display of the IED in an image format categorized by content. The content is customized for the specific user depending on what media services (e.g., cable, broadcast, etc.) the user has in the premise. The content choices spread across numerous sources and devices. Depending on time of the day the user accesses the DBCS software, the content changes depending on content availability at that time of the day.

Once the content is chosen, the DBCS module 101 enables, via the IED, contextual gesture-based control of media components (e.g., volume selection, channel selection, pause/play, etc.) by the consumer. The media component control is enabled through gestures that enable the consumer to access and control media and components without having to look at the IED.

Figure 4:
FIG. 4 is an example screenshot presented on the IED showing context-based and gesture-based media device control, under an embodiment.

FIG. 4 is an example screenshot 400 showing context-based and gesture-based media device control, under an embodiment. This example 400 is shown as an example on the iPhone®, from Apple®, Inc., but the embodiments herein are not limited to the iPhone® and can be used with any processor-based device. The control of media content and devices are enabled through gestures made via the IED. For example when watching DVD players, a single tap on the IED 400 controls the pause function of the DVD, and tapping again on the IED 400 controls the resume play function of the DVD. Similarly, swiping right on the IED screen interface controls the skip function to skip the content to a subsequent chapter, and swiping left controls the skip function to skip the content to a previous chapter. Swiping up and down on the IED screen interface controls the volume on the appropriate media device (e.g., TV, AV Receiver, etc.). Moreover, gesturing right with the IED can control the skip function to skip the content to a subsequent chapter, and gesturing left can control the skip function to skip the content to a previous chapter. Gesturing up and down with the IED can control the volume on the appropriate media device (e.g., TV, AV Receiver, etc.).

The gestures and touch actions of an embodiment control functions based on the context of the media currently being played. The gestures and touch actions can be changed dynamically, for example, from the Internet servers, but are not so limited. FIG. 5 is a table that is a first example mapping ("Eyes on the TV, Until Viewer Presses Search Button") of context based on actions mapped to user actions, under an embodiment. FIGS. 6A and 6B illustrate a table that is a second example mapping ("Eyes on the Device") of context based on actions mapped to user actions, under an embodiment.

The DBCS module 101 enables a consumer to research media choices. Before committing to specific media content, the consumer can use the IED to perform research on the choice using. For example, the consumer can locate detailed descriptions of the media content, details about the plots of a show and collective opinions of others who have previously viewed the content.

Figure 7:
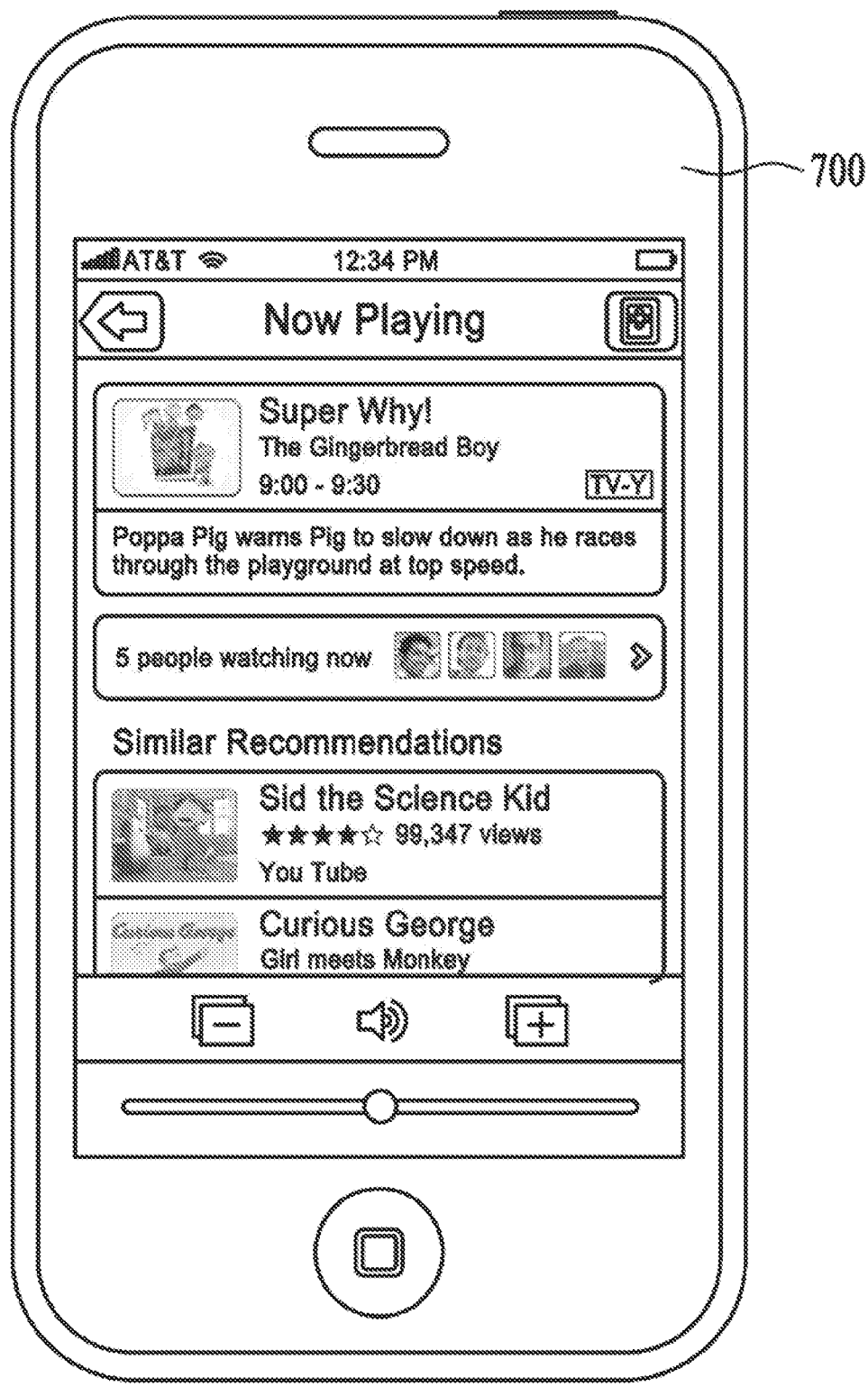
FIG. 7 is an example screenshot presented on the IED showing media content research using the IED, under an embodiment.

FIG. 7 is an example screenshot 700 showing media content research using the IED, under an embodiment. This example 700 is shown as an example for the iPhone®, from Apple®, Inc., but the embodiments herein are not limited to the iPhone® and can be used with any processor-based device. The consumer can use the IED to gather information about media content, for example, a detailed description of program content can be viewed from the IED, or the consumer can research via the IED similar content available from other sources. Additionally, this example screenshot shows the consumer the identity of others who are watching the same show ("5 people watching now") and enables that consumer to share, or socialize, his entertainment experience with his friends. The consumer can also see what his social network friends are watching, and he can find out who else is watching the same show or a similar show to the one he is viewing. Thus the DBCS enables friends to assemble and chat, express or post comments, and/or rate specific media content.

While watching a specific show, the consumers can share their experience with others over the Internet through operation of the DBCS module 101. A consumer can share with their friends on social networks. Furthermore, they can publish what they are watching and chat with their friends to find out more about the show or discuss the show. All these operations can be performed via the IED from where the user chose the content.

Figure 8:
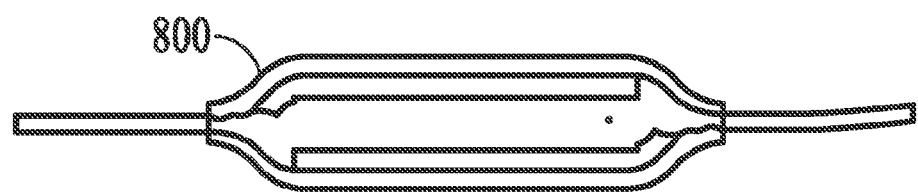
FIG. 8 shows the form factor of the zHub, under an embodiment.

In some embodiments, the DBCS my include a zHub, which is a device that couples or connects on a first end to a power outlet (e.g., alternating current (AC) power) and couples or connects on a second end to a router or other network switch in the host premise. FIG. 8 shows the form factor 800 of the zHub, under an embodiment. The zHub, when coupled or connected to the router, is a participating device in the premise network and, as such, can access the Internet or other network via the router. The zHub, by virtue of being tethered to the premise network, is available on the premise network to be discovered and coupled to by the IED. The zHub publishes its IP Address via UPNP packets, and this enables the IED to discover or identify the zHub and form a coupling or connection to the zHub. Once the IED discovers a zHub in the network, it associates with the zHub.

When the IED sends a command, the zHub receives the command from the IED and resolves the command into a specific instruction directed at a specific zNode in the house. As such, the zHub resolves or maps the command to a specific IR code to be sent to a specific zNode via an RF signal. The zHub can cache IR codes or other data that may be used to control media devices. If the appropriate IR code is not available in the cache, the zHub looks up the code (e.g., from the internet server) as the zHub is always connected to the internet via the premise router. There may be more than one zNode on a premise and, if so, the zHub manages all registered zNodes on the premise. Furthermore, a single zHub can simultaneously interact with more than one zNode. As an example, when a user selects content that is on channel 324 to be displayed on the living room TV, the zHub translates the command into a specific RF signal directed at the zNode in the living room.

Figure 9:
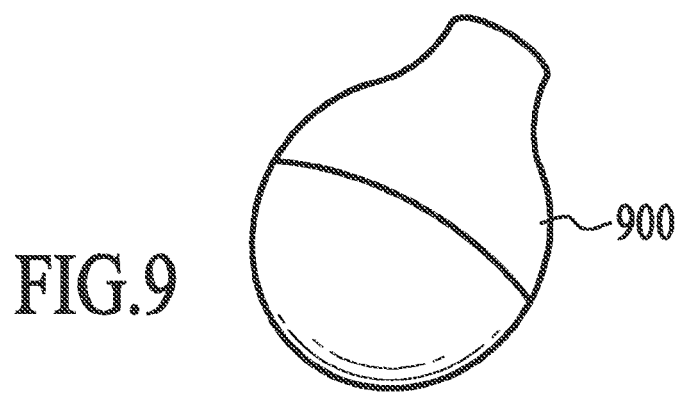
FIG. 9 shows the form factor of the zNode, under an embodiment.

The zNode is a device that can be placed on a structure (e.g., piece of furniture, shelf, etc.) in the premise in a position from which it has a reasonable line of sight to the media components. FIG. 9 shows the form factor 900 of the zNode, under an embodiment. The primary function of each zNode is to receive commands from the zHub and translate the commands for control of media devices via the media device control protocol. The zNode of an embodiment is battery-operated, but is not so limited. The zNode receives commands from the zHub via RF signals and translates the commands to IR signals. Generally, the IR code data itself is cached in the zNode, but if not cached, the zHub is aware and transmits the IR code as a part of the request. Using information of the received command, the zNode broadcasts a corresponding IR signal to control the media devices.

In addition to emitting IR signals, the zNode also receives IR signals. This capability enables a consumer to learn/teach codes into the DBCS that are not available as a part of the DBCS IR database. The zNode also monitors battery performance and reports the battery information to the zHub; the zHub reports the batter information back to the IED (e.g., on request). The zNode of an embodiment can receive and process analog signals and, thus, can receive information of other premise parameter sensors (e.g., room temperature, sound levels, compass, accelerometer, etc.) that can be used as media device control parameters.

Figure 10:
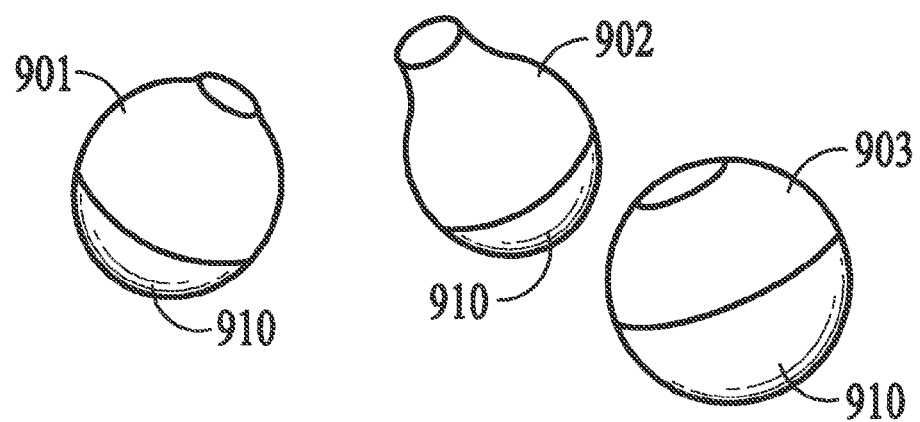
FIG. 10 shows the form factor of the zNode base with three (3) different tops, under an embodiment.

One zNode is used to correspond to each TV at the consumer's premise. All zNodes of the premise are registered with the zHub. The tops of the different zNode "fruit" are exchangeable with the base being the same, and this enables consumers to mix and match any fruit if they are purchasing multiple fruit for their different media systems. FIG. 10 shows the form factor of the zNode base 910 with three (3) different tops 901/902/903, under an embodiment.

The DBCS comprises a Content Index Database (CID), as described above with reference to FIGS. 1A and 1B. The CID of an embodiment, also referred to as the program database, is hosted on an internet server and manages electronic program guide information, but is not so limited. The CID comprises all program information related to premise entertainment for a specific user. As an example, the CID comprises the data for an electronic TV Guide.

Figure 11:
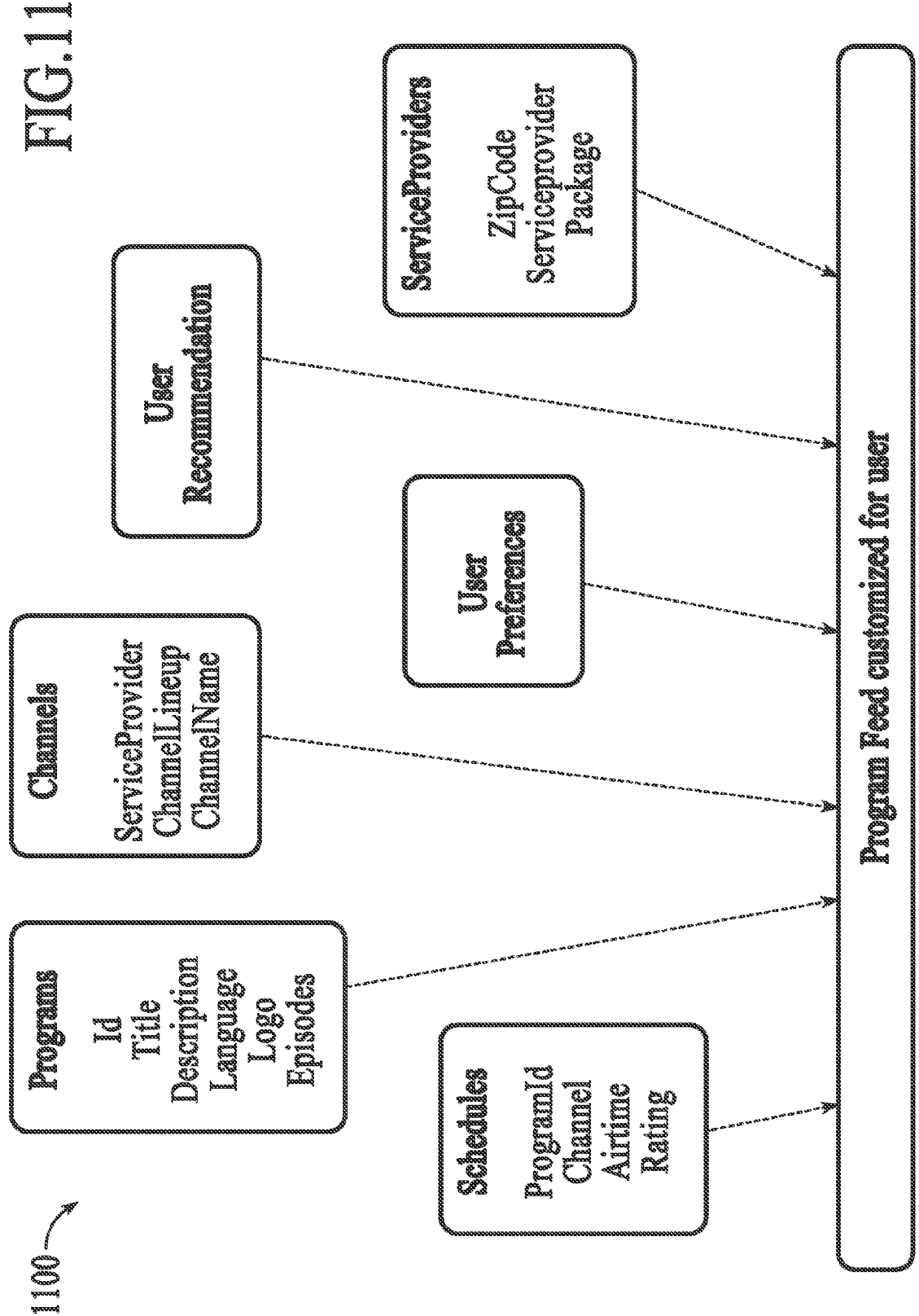
FIG. 11 is a block diagram for generating a custom program feed for the Content Index Database (CID), under an embodiment.

FIG. 11 is a block diagram 1100 for generating a custom program feed for the CID, under an embodiment. The CID receives a periodic feed of content metadata from different systems (e.g., TV Guide data (received from Tribune Media Services), DVR, internet media content, VOD, etc.), and aggregates the content index (metadata) from these sources. This data is received in a source-proprietary format, and includes data of schedules, programs, channels, service providers, user recommendations, and user preferences, to name a few. The DBCS includes a universal data loader (e.g., an XML-based data loader) that can load any media metadata from any source; the DBCS achieves this based on a data format dictionary for each source. The DBCS reformats the received data to a format that is easily browseable and searchable. The DBCS recommendation system uses the CID to generate tailored content for each consumer.

The CID is refreshed periodically (e.g., every night, every twelve hours, every hour, etc.) using a periodic feed of content metadata received from different systems (e.g., TV Guide data is received from Tribune Media Services, DVR, internet media content, VOD, etc.). In processing the data, the received content metadata is placed in a staging area and checked. The large volume of metadata is processed using a rules-based engine that automatically loads the data and classifies it into DBCS genres. The incoming metadata corresponding to the content is automatically classified into a smaller set of genre that the user can manage. This auto-classification is performed using a cross-reference between source genres and destination genres. The processing of an embodiment automatically re-links the images that serve as a primary interface to the users.

The periodic process or refreshing the CID includes the use of crawlers that crawl media sites (e.g., video, music, images, etc.). The crawlers index content metadata (URLs) from a multitude of media sites, and data resulting from crawling activity is stored at the CID. Because the DBCS of an embodiment is directed at TV and movie content, the crawler uses the TMS data as a basic dataset such that the TMS constrains the crawler to stay within this known or pre-defined realm, but the embodiment is not so limited. The CID of an embodiment, however, extends to any media from any source. Similarly, the CRS also functions with any type of media from any source.

The DBCS comprises a device map and infrared database, hosted on the internet server, used in the management of media components at the premise, as described above with reference to FIGS. 1A and 1B. The device map and infrared database of an embodiment includes a device map database and an infrared database, as described below.

The infrared database comprises the infrared codes needed to control the media components in a premise. The DBCS stores and maintains the infrared database on one or more Internet servers. The control codes necessary for a specific premise are written to the premise zHub on demand during initial system configuration. The infrared codes are maintained in a DBCS universal control format, referred to herein as the UES Format. As new consumer electronic devices come into the market their respective codes are made available in this database so that the codes are available to the consumers on demand.

Figure 12:
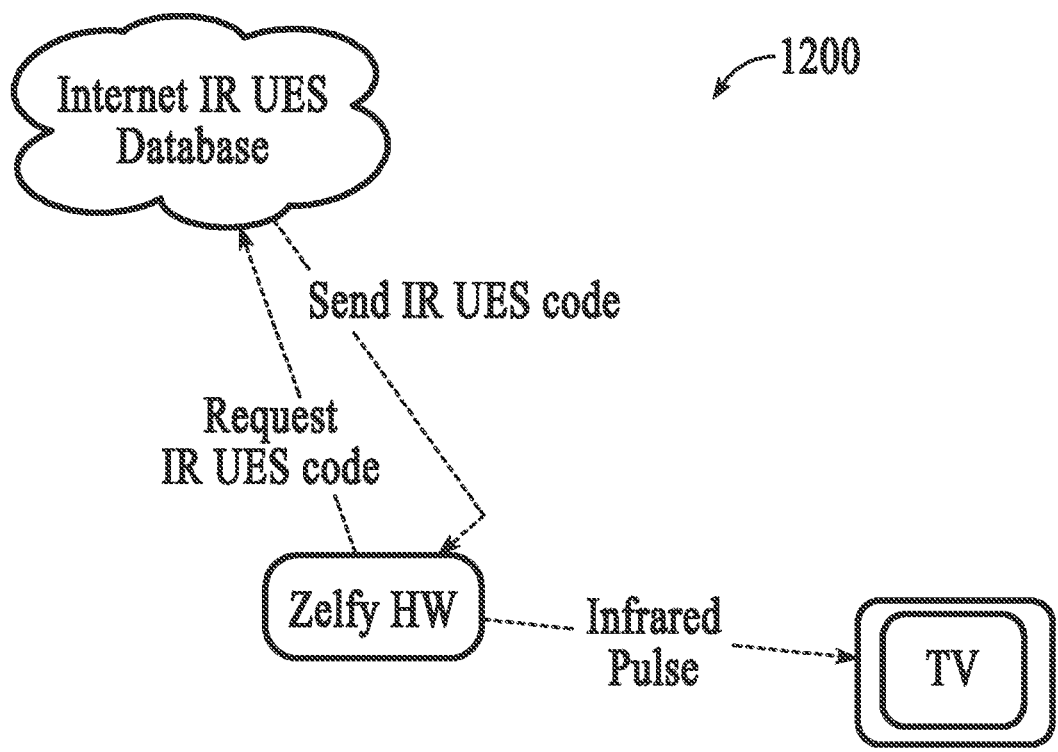
FIG. 12 is a block diagram for transferring codes to and from the IR code database (UES format), under an embodiment.

The UES Format is an DBCS-proprietary format for storing infrared codes in raw format in the database. Unlike conventional solutions that store IR codes in a compressed format, the UES Format stores the frequency and Mark-Space timings of the IR pulses as a series of numbers. This enables storage and delivery of the codes via an internet connection or coupling. The storage and distribution of individual infrared codes is through a webservice-based request-response architecture. The Infrared codes are also cached on the zNode and/or zHub. FIG. 12 is a block diagram 1200 for transferring codes to and from the UES database, under an embodiment.

Figure 13:
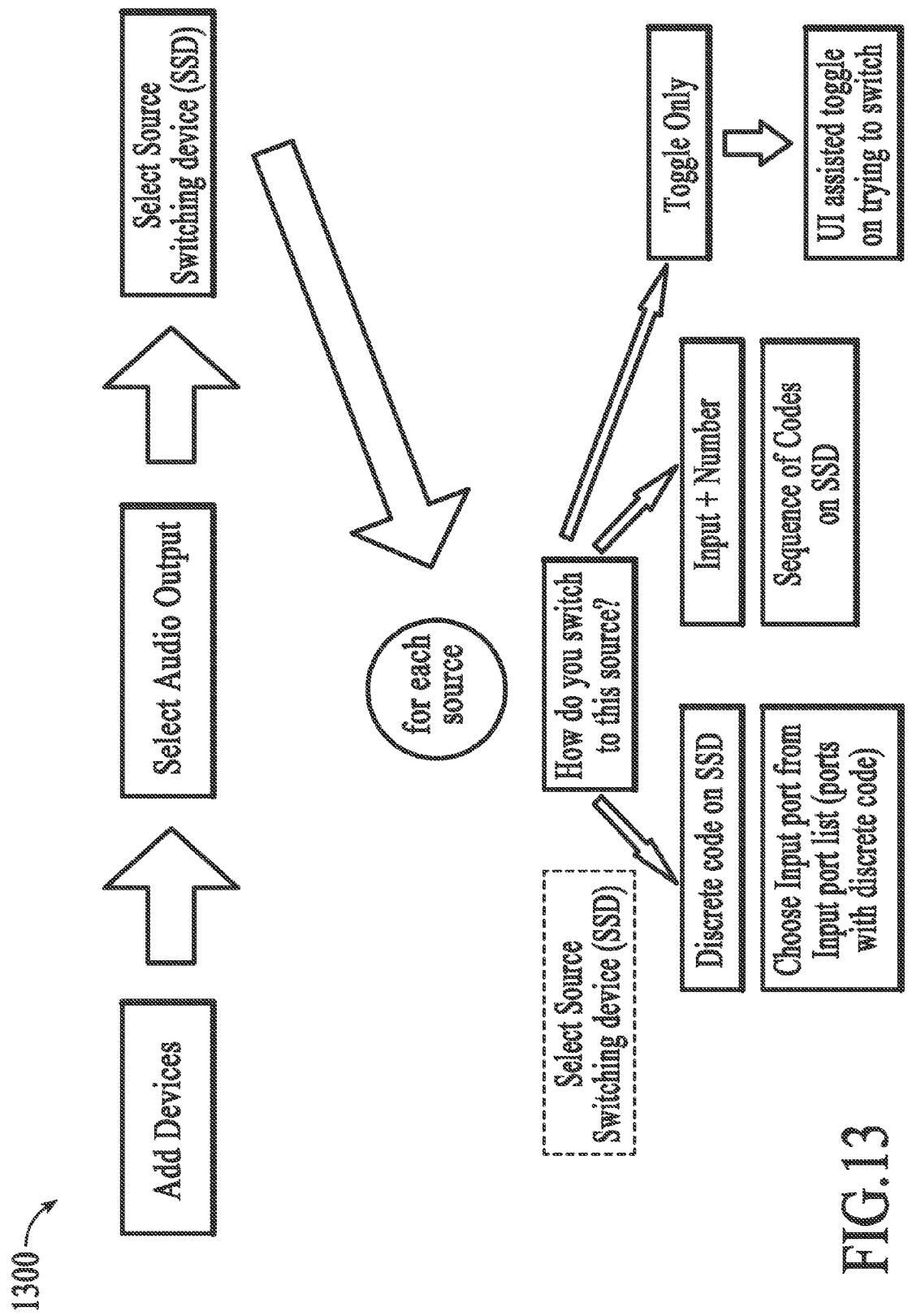
FIG. 13 is a block diagram for premise component configuration setup, under an embodiment.
Figure 14:
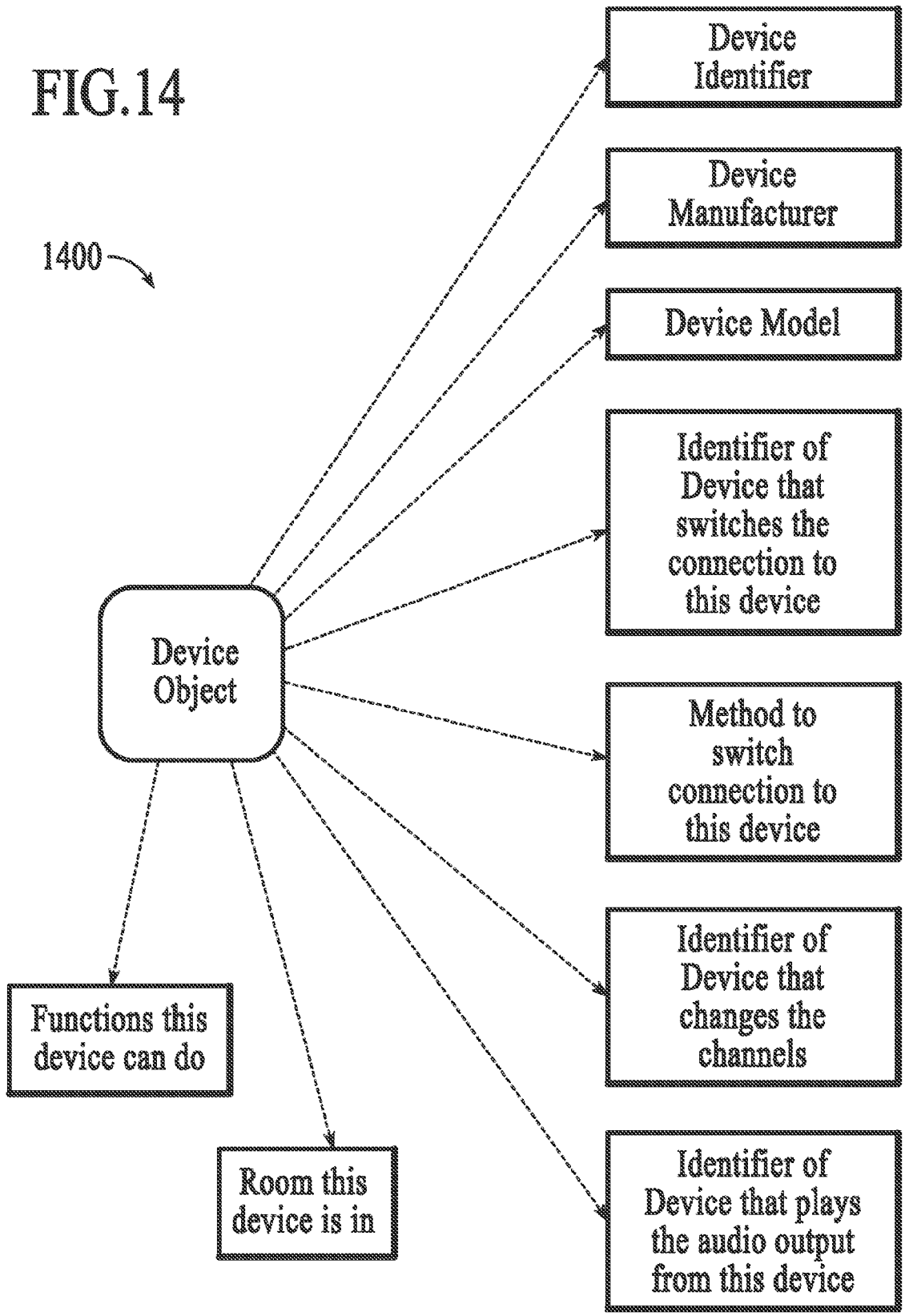
FIG. 14 is a block diagram of a logical representation of a media device in a premise component configuration setup, under an embodiment.

In order to provide a device-agnostic entertainment experience, the device map database of an embodiment comprises a logical representation of each of the devices at a consumer's premise and the configuration in which they are coupled or connected. The media component configuration of a premise/user is abstracted by core functions (e.g., audio output devices, video output devices, video content sources, audio output sources, intermediate switchers, etc.) and the various component relationships, for example, and is logically represented as relationships between these participants. This enables the DBCS to scale across various consumer configurations at a premise. FIG. 13 is a block diagram 1300 for premise component configuration setup, under an embodiment. FIG. 14 is a block diagram 1400 of a logical representation of a media device in a premise component configuration setup, under an embodiment.

Figure 15B:
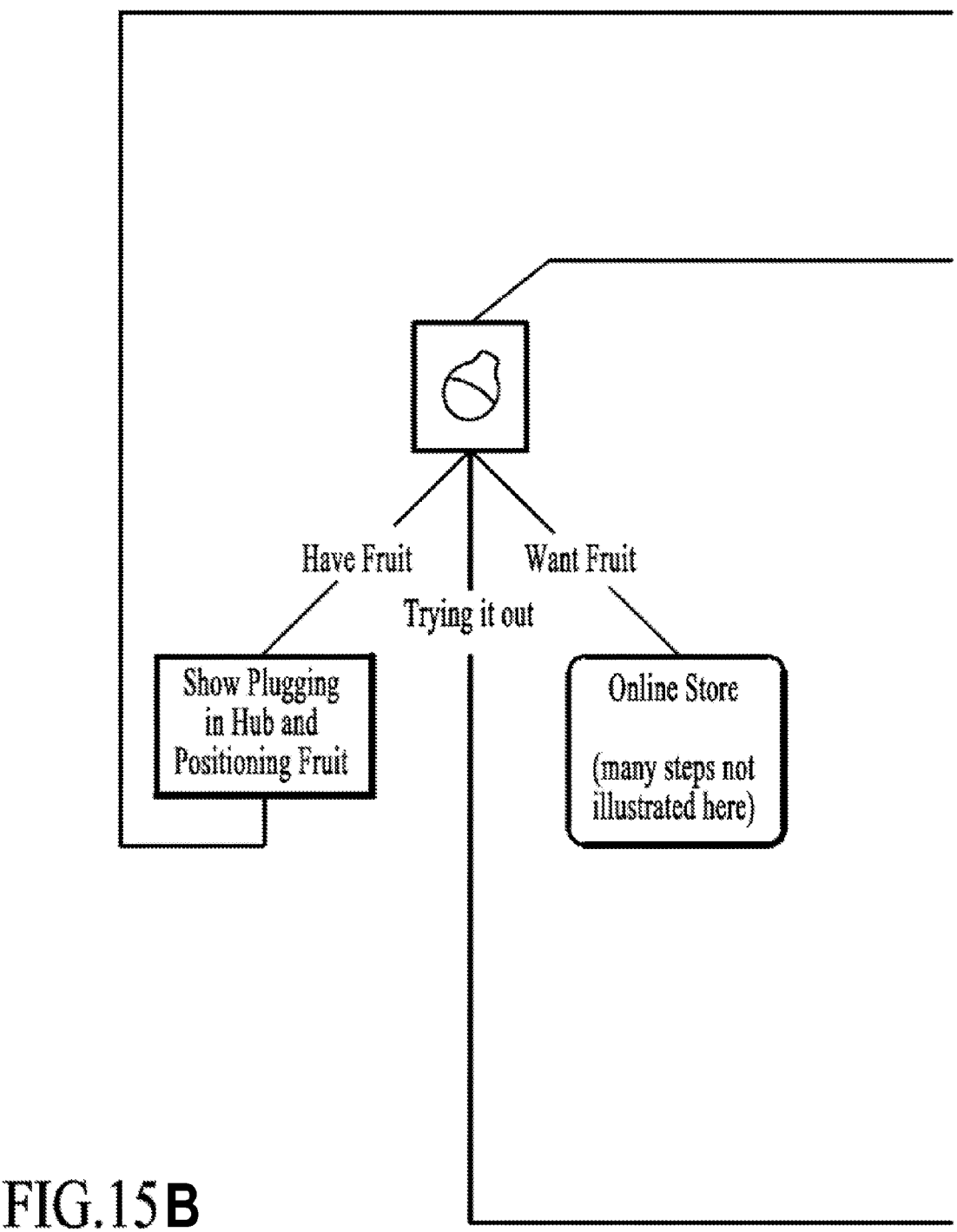
FIG. 15 (collectively 15A through 15L) illustrates a flow diagram for specifying and configuring the DBCS to interact with media components at a premise, under an embodiment.
Figure 15C:
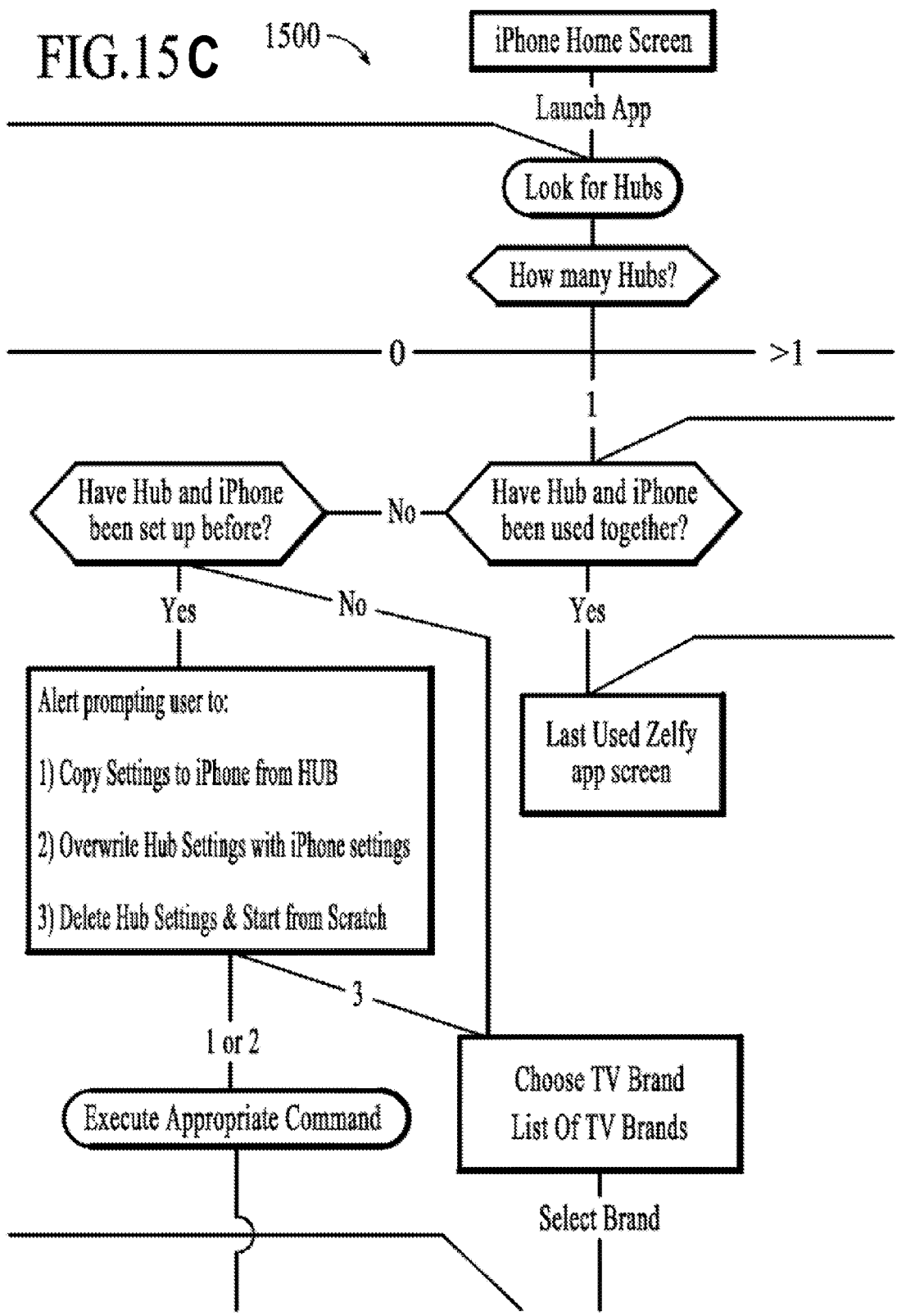
Figure 15D:
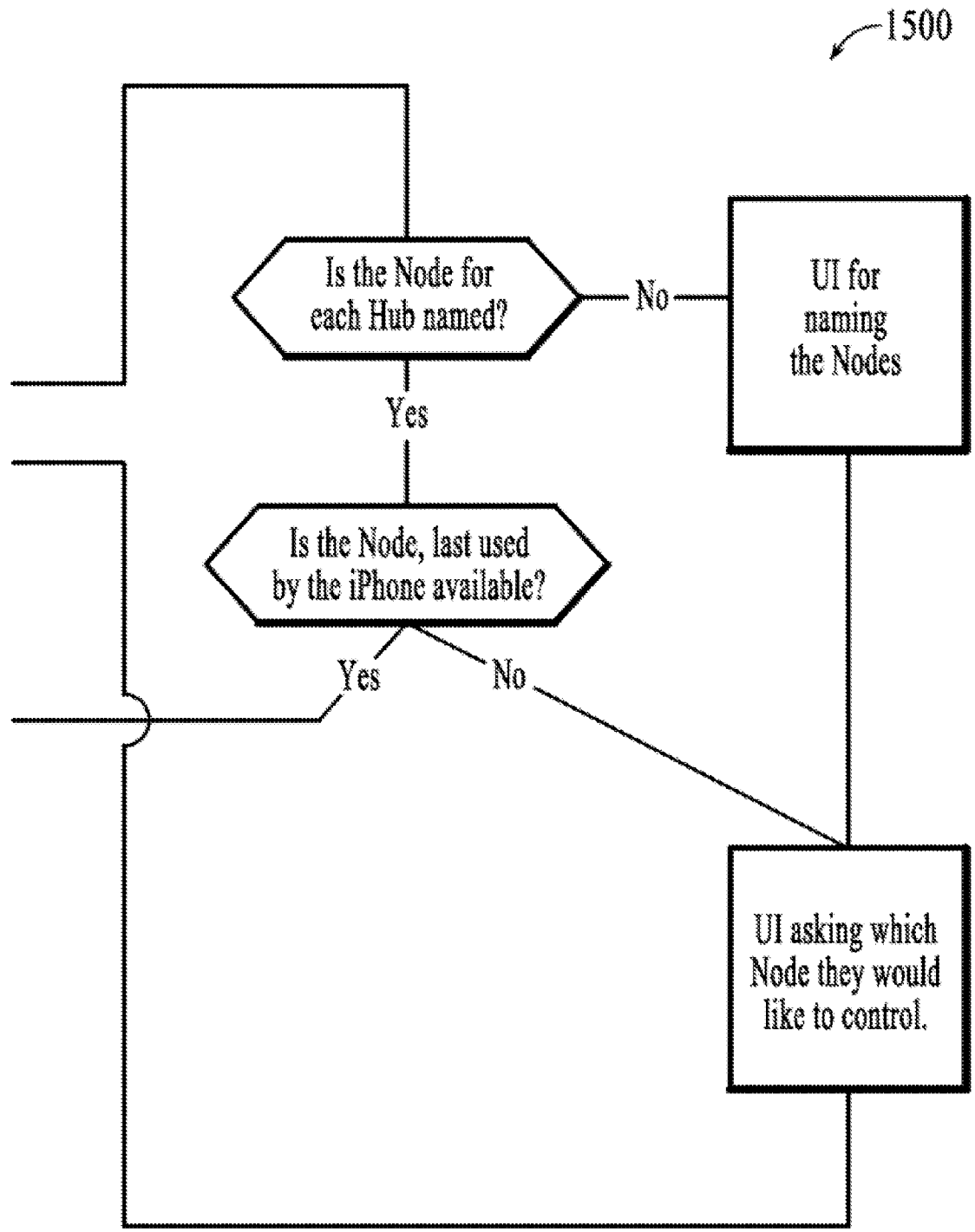
Figure 15E:
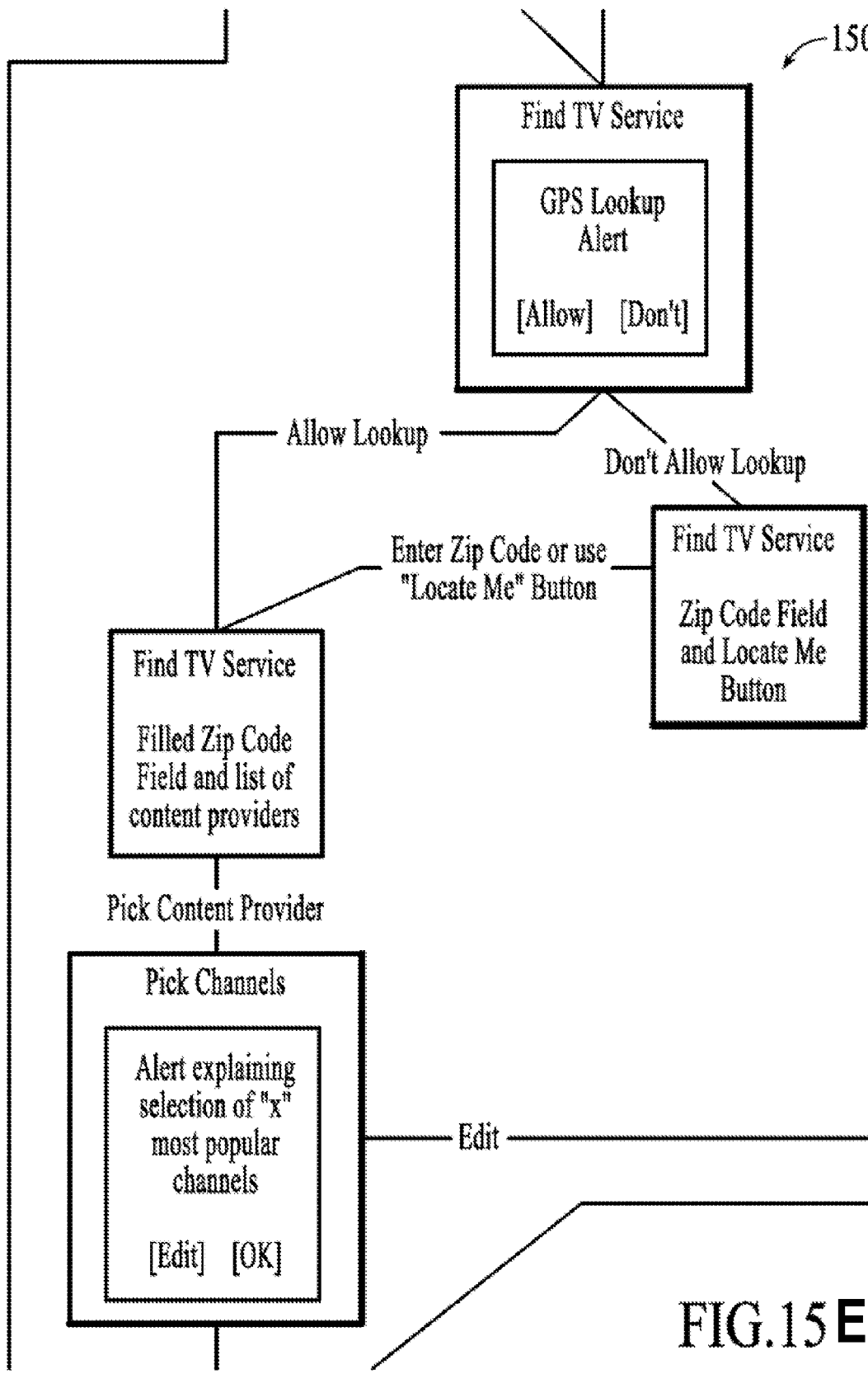
Figure 15:
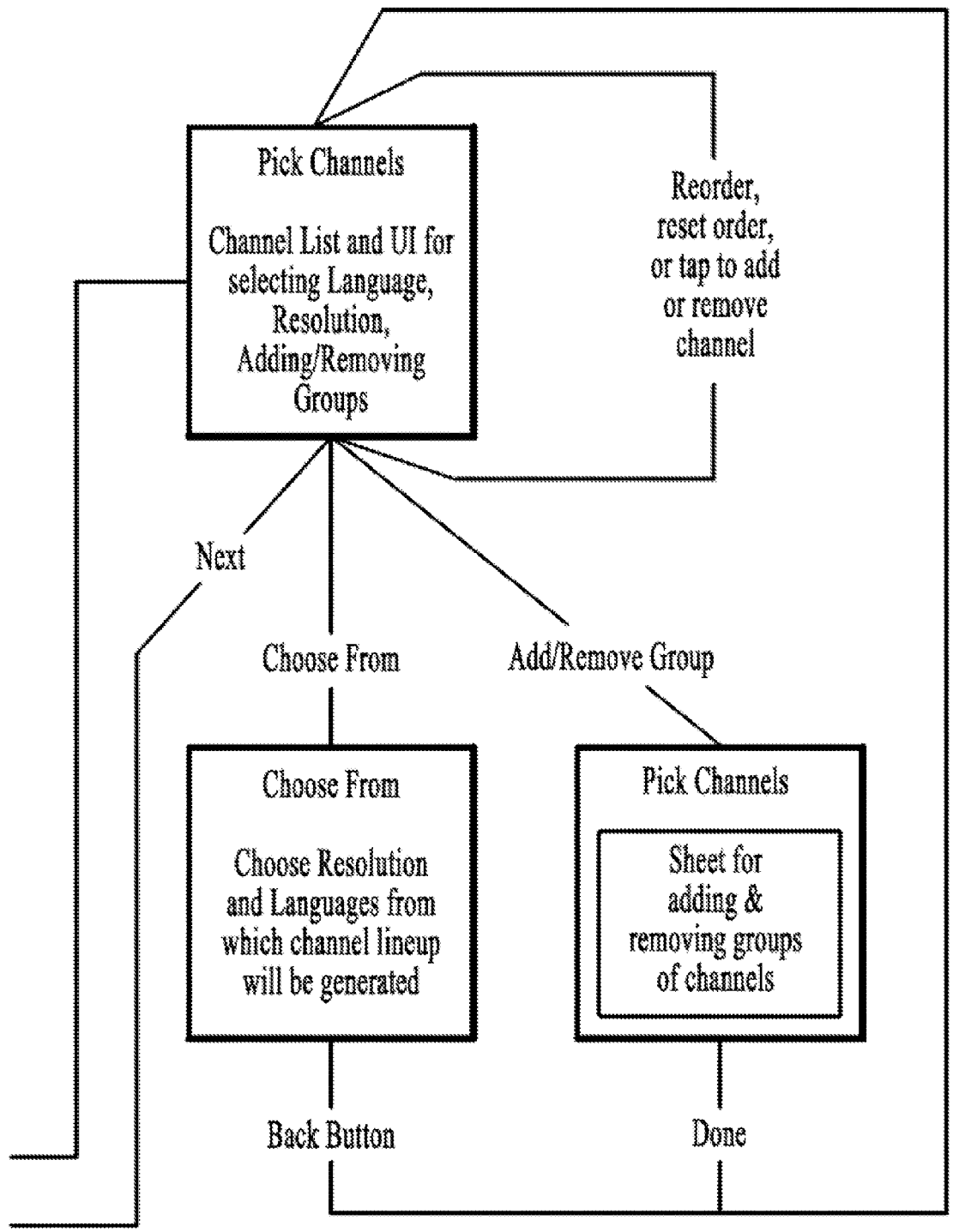
Figure 15G:
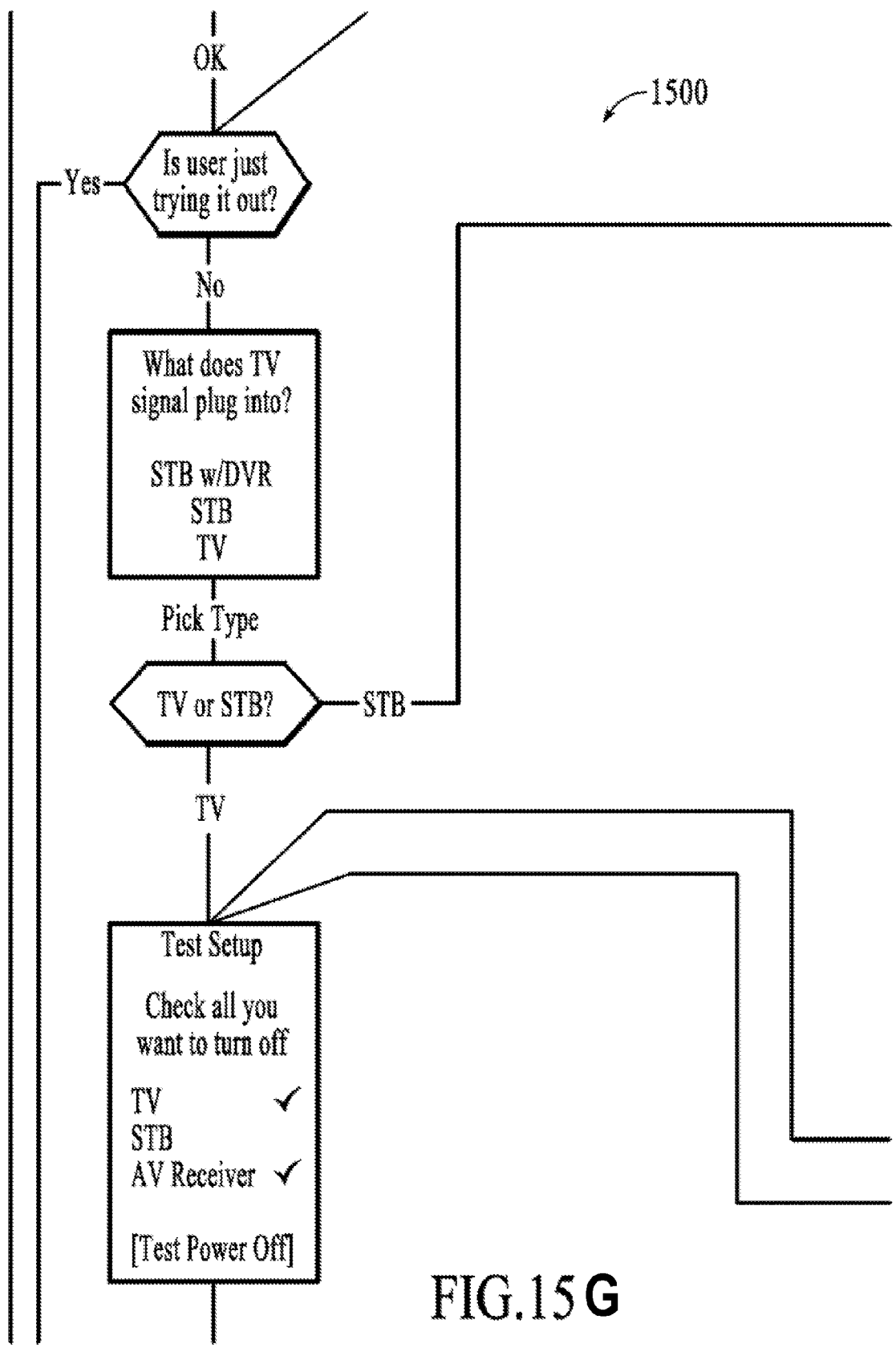
Figure 15H:
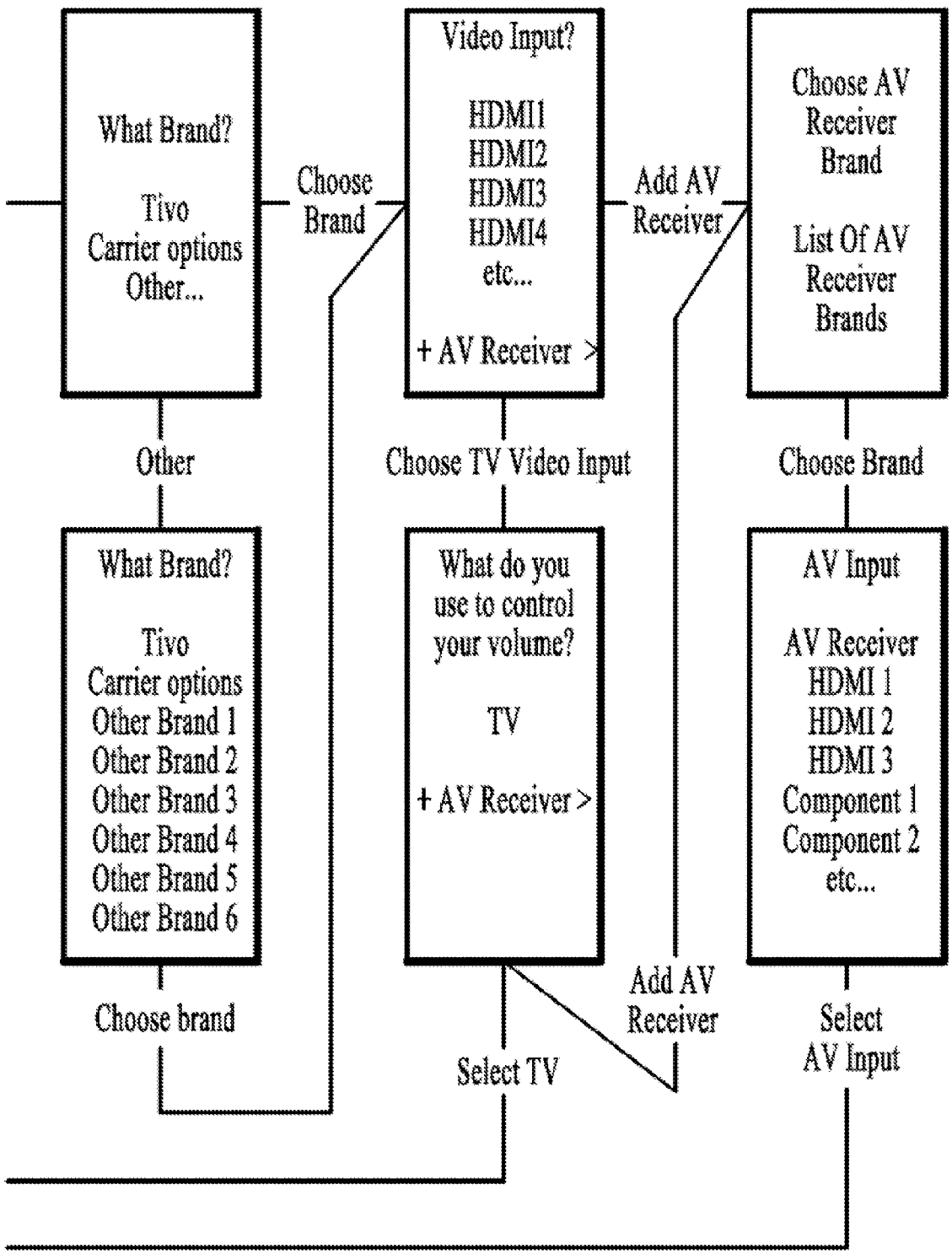
Figure 15:
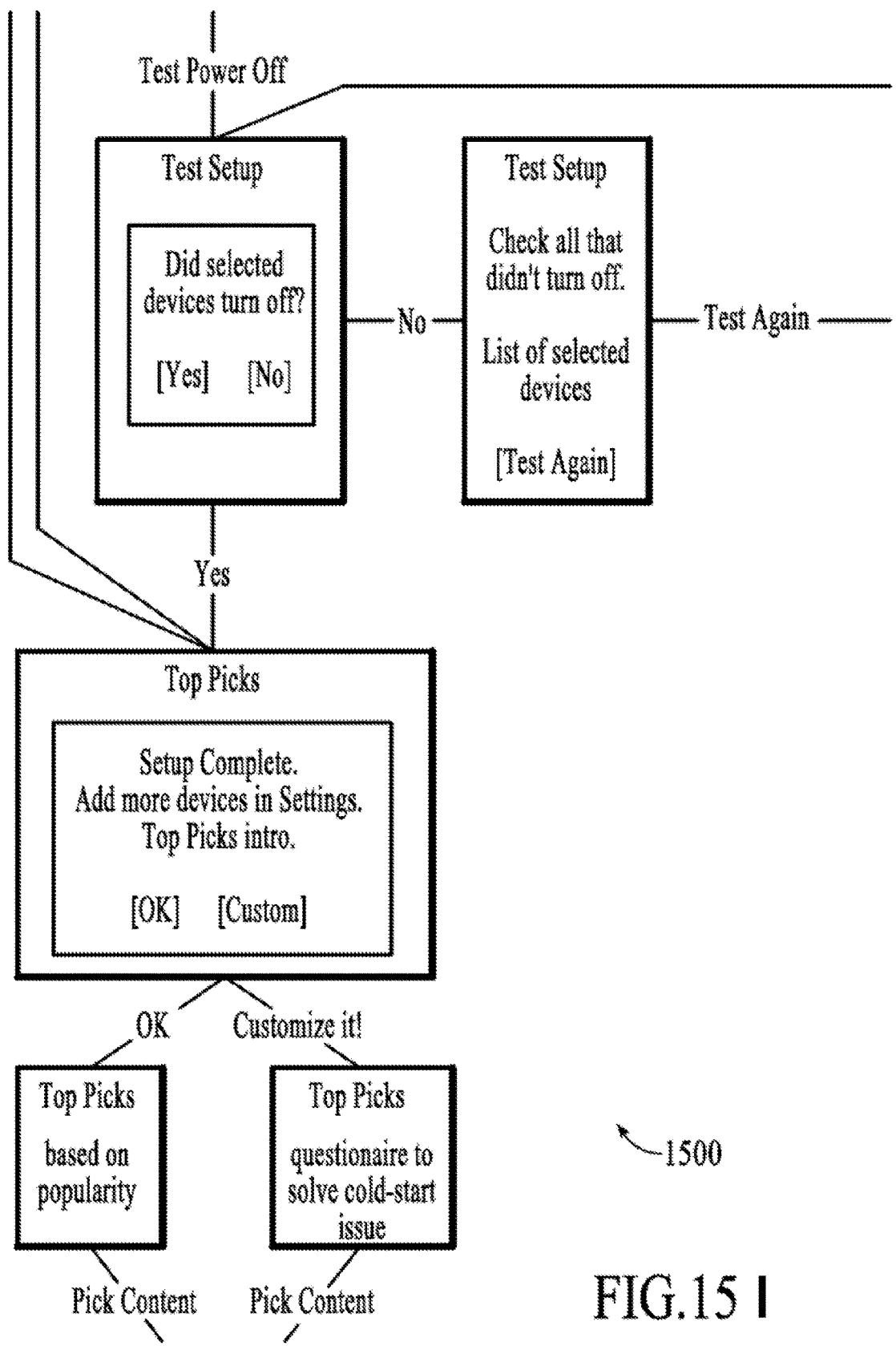
Figure 15:
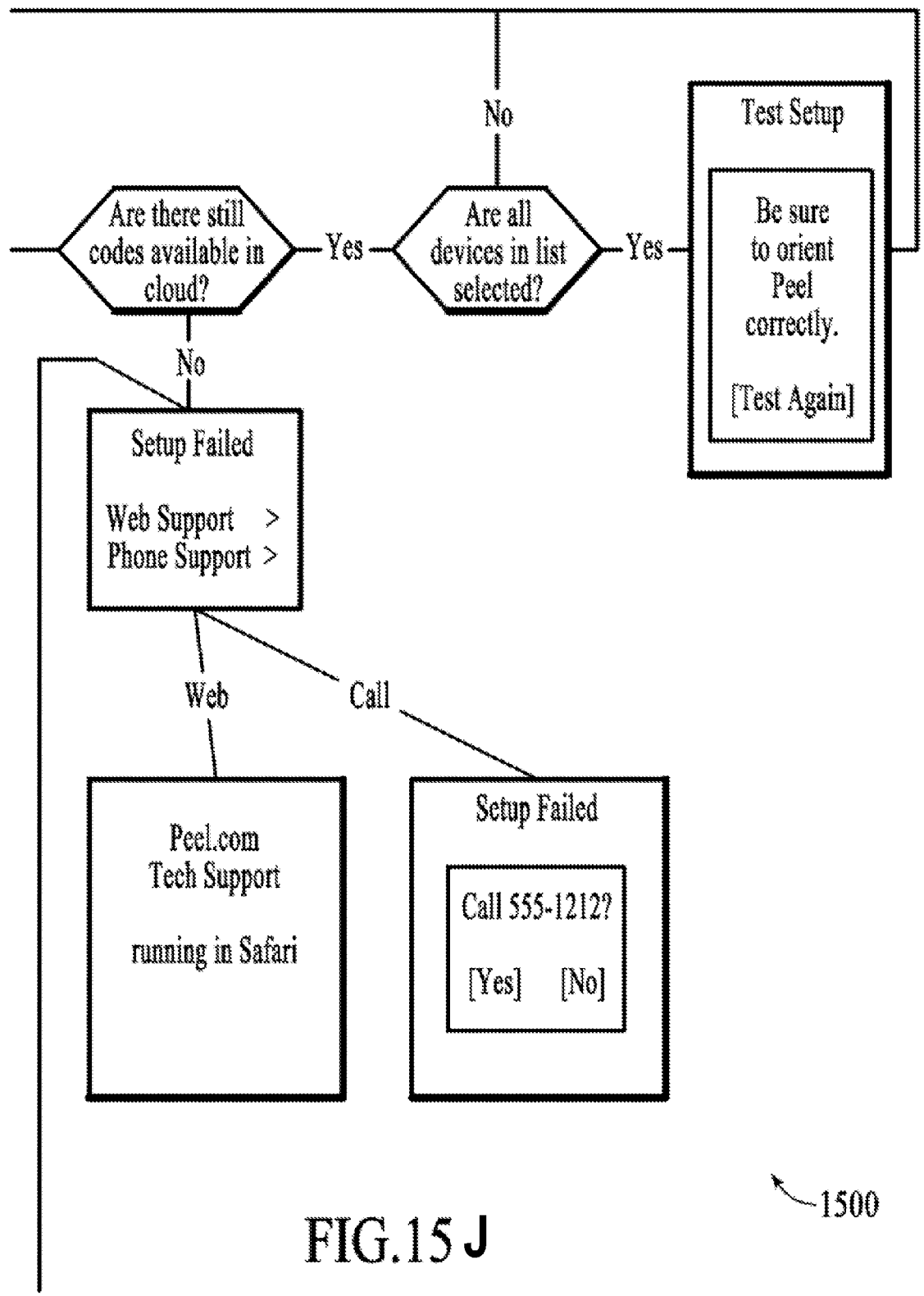
Figure 15:
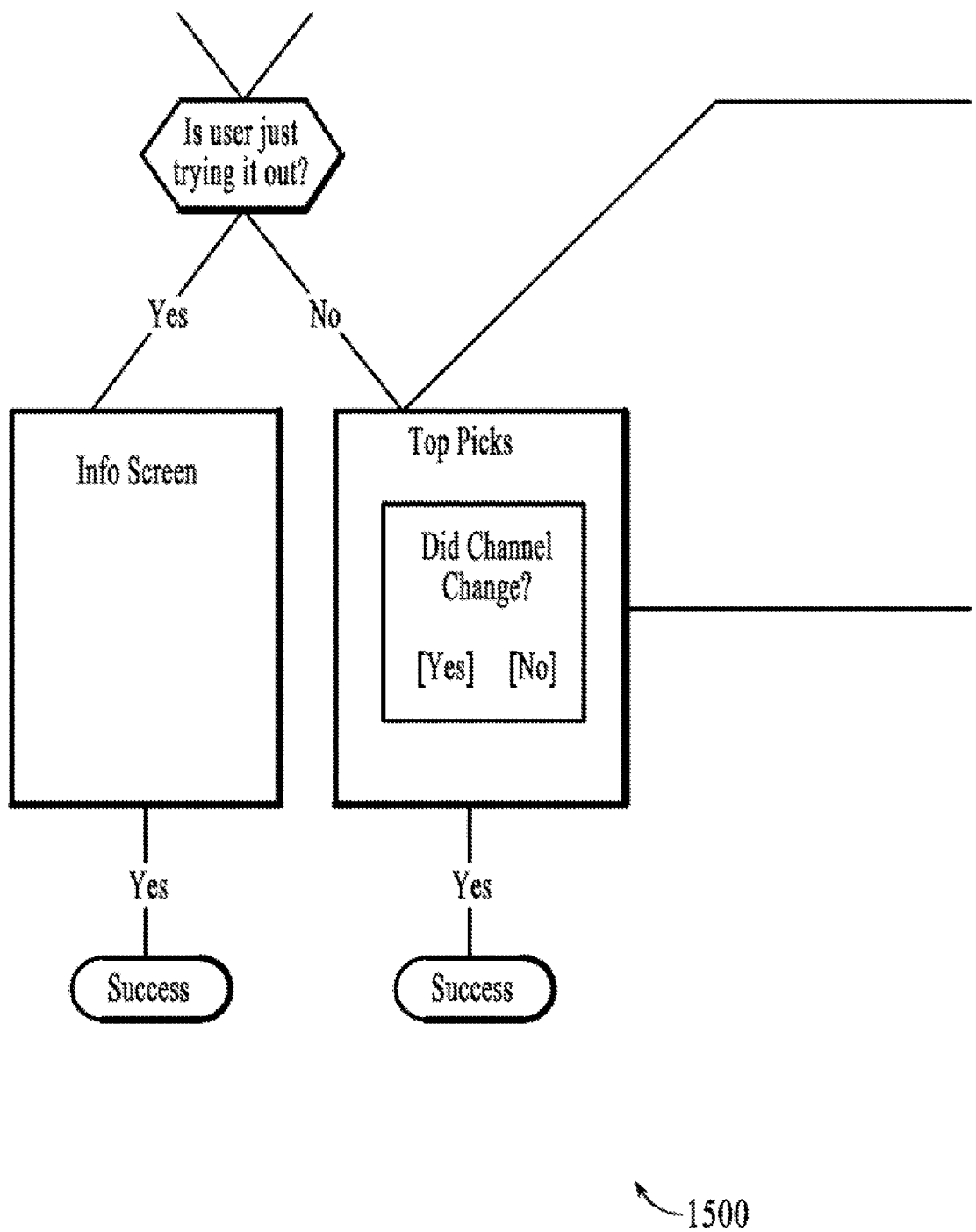
Figure 15:
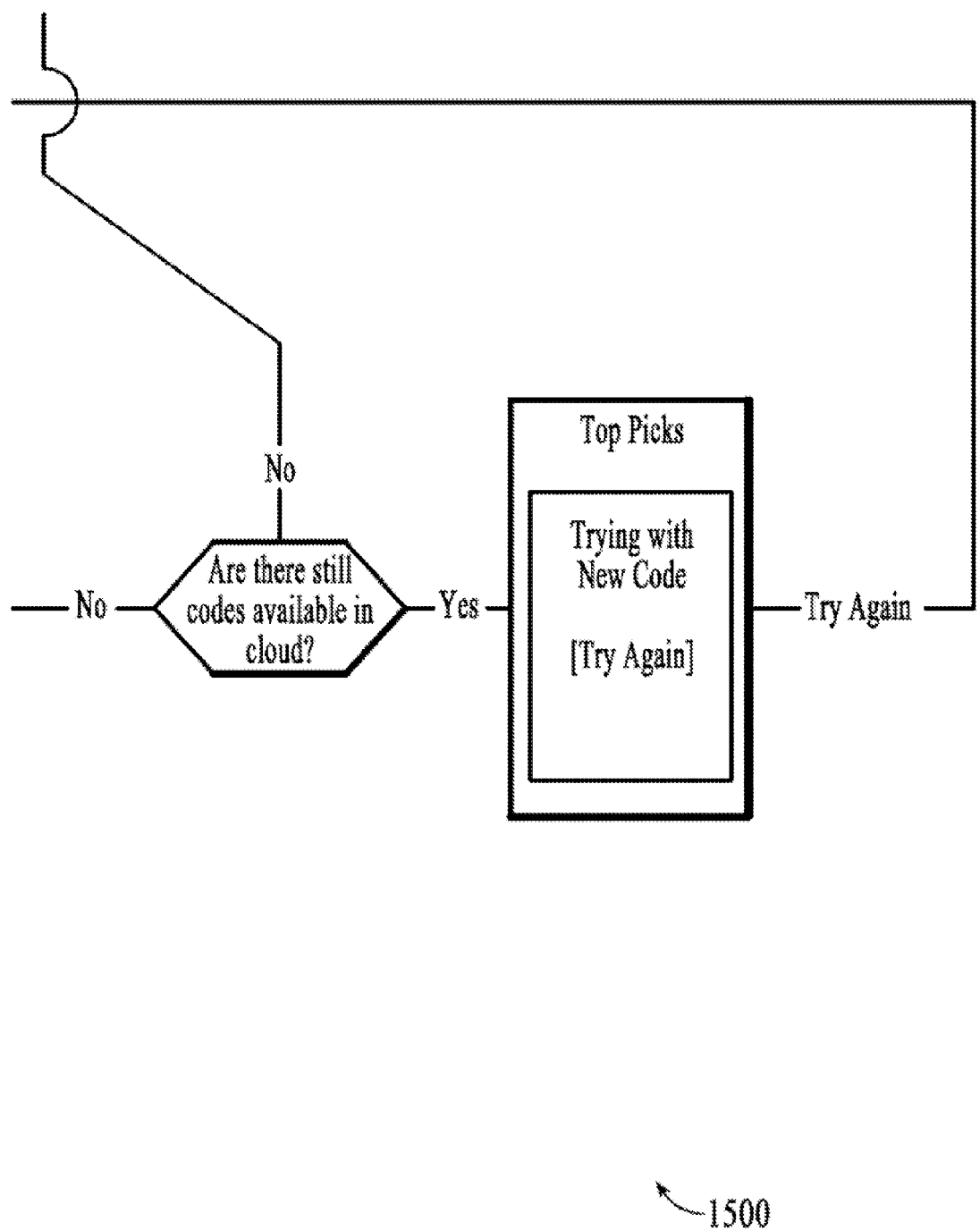

The user provides the configuration information when he sets the system up for the first time. FIG. 15 (collectively 15A through 15L) illustrates a flow diagram 1500 for specifying and configuring the DBCS to interact with media components at a premise, under an embodiment. The device map database stores every user's media system configuration, and, as a consumer adds new devices to the configuration, the new device is added to that consumer's configuration database. The device setup information of a user's premise is transformed to a connection map and is stored in the device map database; furthermore, a local copy of this configuration database is stored in the IED.

As described above, consumers of media content are faced with the ever increasing dilemma of finding interesting content to watch from a variety of sources (e.g., broadcast TV, internet TV, satellite TV, DVD, VOD, etc.). As a solution, the DBCS of an embodiment comprises a personalized Content Recommendation System (CRS) to identify content that will be of interest to a specific user irrespective of its source and to provide the recommendations to the user in a personalized way. The provision of such a discovery mechanism has been shown to significantly increase consumer satisfaction and is rapidly becoming an essential tool for any form of content (e.g., retail, news, blogs, TV, movies, music, etc.) where there is significant number of alternatives to chose from.

The personalized CRS provides a set of recommendations that significantly enhance the user experience of the DBCS. Recommendations of the CRS take into account not only the personalized desires of an end user, but also the context in which the recommendation is made. Therefore, the CRS recommendations are both personalized and contextualized. For example, an individual is likely to want to watch different content at 3 pm on a Wednesday afternoon than the content that they will want to watch on Friday at 11 pm and this should be taken into account when making recommendations. Similarly, an individual's mood will influence the content that they wish to watch. The CRS evolves continuously as it receives and assimilate additional information about a consumer's viewing habits.

The CRS of an embodiment performs attribute matching. Consequently, it starts with little consumer behavior information, (the Cold Start problem), and the initial approach is based on matching consumer preferences for program attributes with the attributes of forthcoming shows. So, for example, the genre and channel on which a program is shown will be used to generate initial recommendations. Research on TV schedules shows that this will provide "safe" choices for the end user. These recommendations are combined with a random, but carefully selected, set of other choices to provide an initial collection of recommended content.

The CRS of an embodiment performs collaborative filtering. Good recommendations flow from accounting for user behavior as this enables the "wisdom of the crowds" to be used to tailor recommendations. As data is collected, recommendations based on matching similar users and similar program content are combined into the recommendation scheme. This combination of approaches provides better recommendations than either approach used alone.

The CRS of an embodiment provides context-based recommendations. Context-based recommendations are generated by weighting recommendations based on the time of the program being shown (e.g., horror shows are recommended more during the evening, etc.) and by providing access to the programs via genre (use as an initial surrogate for mood). As detailed viewing statistics are received, the CRS of an embodiment shifts the basis for the contextual recommendations from those purely based on metadata to recommendations based on contextual information extracted from user viewing habits.

Figure 16:
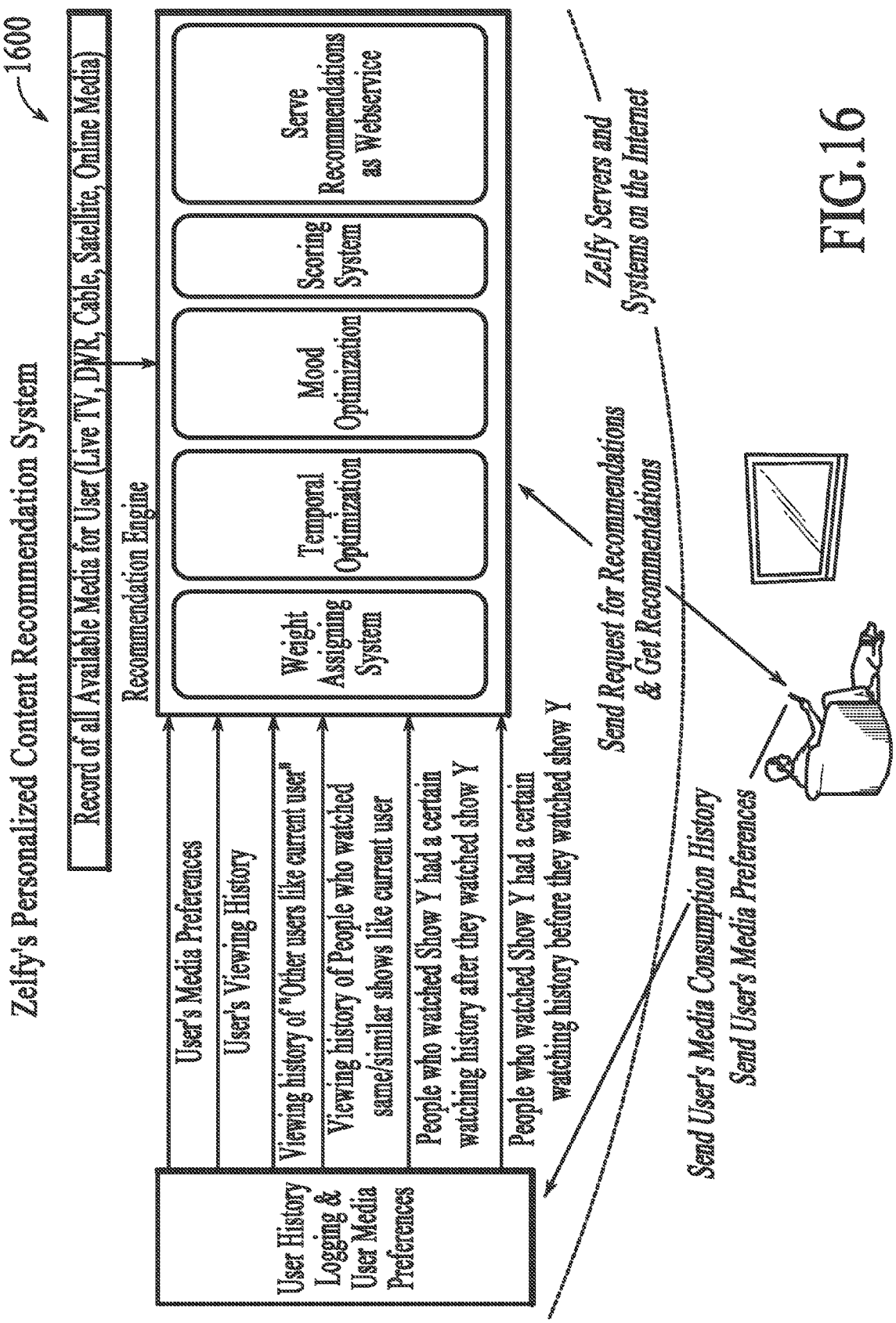
FIG. 16 is a block diagram for operation of the Component Recommendation System (CRS), under an embodiment.

FIG. 16 is a block diagram 1600 for operation of the CRS, under an embodiment. Operation begins when a user opens the DBCS module 101 on his IED. The DBCS module 101 records local time. The DBCS module 101 sends to the DBCS Recommendation System (CRS) running on the DBCS servers a request for a list of recommendations for the user. The DBCS module 101 sends the local time and current mood to the CRS.

The CRS of an embodiment comprises a recommendation engine that includes a weight assigning system, temporal optimization component, mood optimization component, scoring system and webservice component to serve recommendations. The recommendation engine receives inputs including a record of all available media for a user, and inputs from user history logging and user media preferences component. The inputs to the CRS of an embodiment comprise one or more of the following, but the embodiment is not so limited: current local time of user; user media preferences, where the media preference comprise preferences of one or more subgroups including Language Preference, Media Quality Preference (e.g., Hi Definition Only, Standard Definition Only, etc.), Genre Preference (e.g., Action, Adventure, etc.), Channel Preference (e.g., NBC, ABC, Discovery, etc.), Source Preference (e.g., Online, Live TV, Cable, etc.); user viewing history; viewing history of users similar to the current user; viewing history of users that watched same/similar shows as the current user; succeeding viewing history of other users, after they watched a particular show; preceding viewing history of other users, before they watched a particular show; given the current local time, the list of all media available to the user.

Using the CRS inputs described above, the CRS generates a list of recommended content that is available for the user. The list of recommended content is presented to the user, and the user selects media content from the list. Using the IED interface, the user selects the content and starts enjoying the content. The user's selection is recorded and sent back to the User History Logger for subsequent use in the CRS.

Because well implemented "discovery mechanisms" are used more frequently than search mechanisms when both are provided on a website, the CRS, via presentation on the IED of an embodiment, presents a 'Top Picks' page of recommendations and not a search page. The CRS, via presentation on the IED, also leads with content ordered by genre (e.g., News, Comedy, etc.) in order to facilitate users selecting content. In order to reduce the amount of searching required to locate a desired program, the CRS, via presentation on the IED, lists content according to the likelihood (based on their previous viewing history) that the individual wishes to watch each program. Furthermore, the CRS, via presentation on the IED, lists all content that is viewable (and perhaps some that is not currently viewable using the current channel setup), to ensure that the user is not limited in the choices they make.

Figure 17:
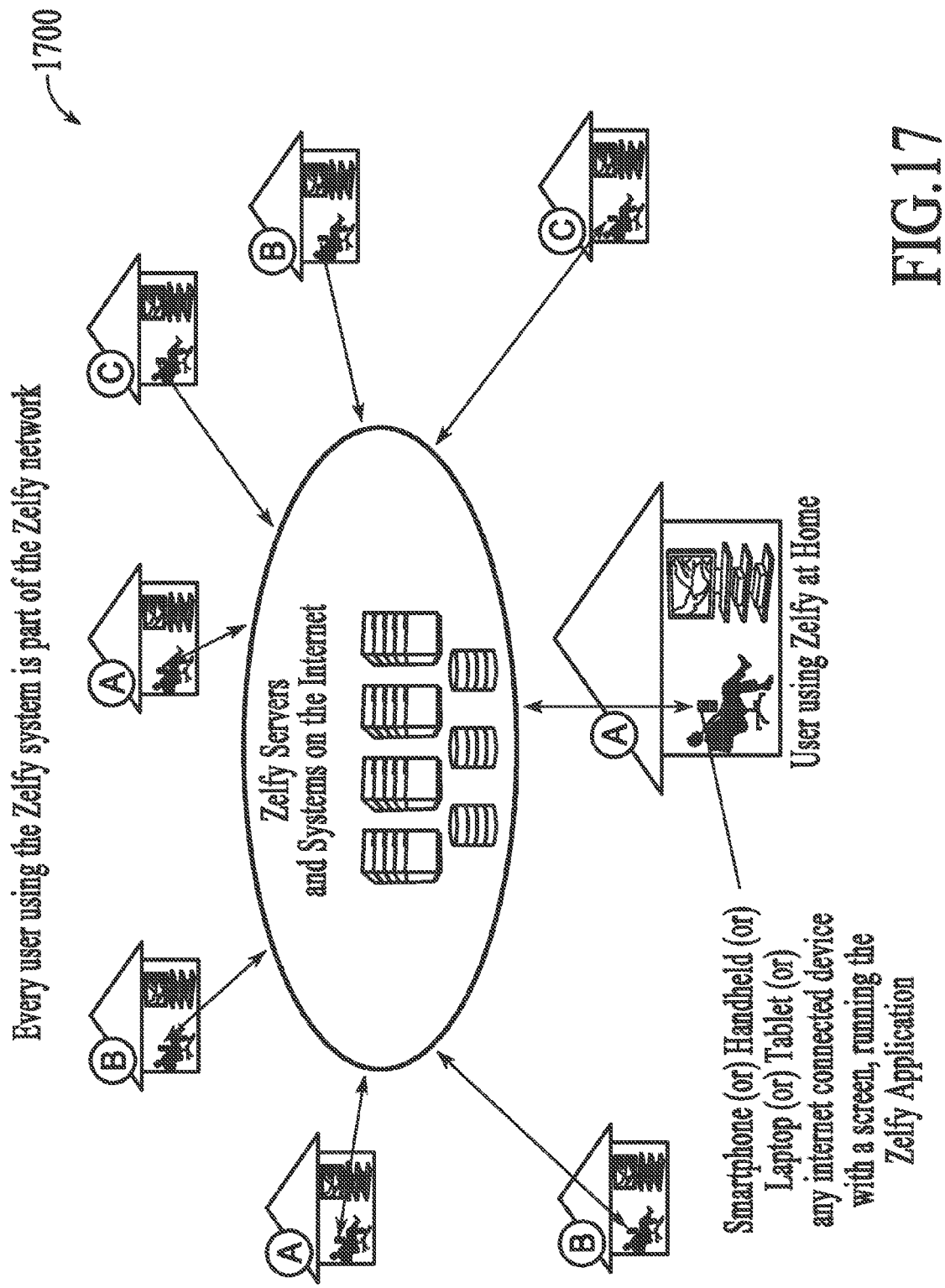
FIG. 17 is a block diagram of a social network formed among DBCS users, under an embodiment.

The DBCS uses the DBCS software or applications running on the IED and/or on remote servers to automatically form a social network (referred to herein as the DBCS Network) that includes all users of the DBCS system. As such, the DBCS enables social interactions around the DBCS Network such that DBCS users connect with other users, discover people with like interests, and communicate with other people. FIG. 17 is a block diagram 1700 of a social network formed among DBCS users, under an embodiment. The social network of this example includes friend groups A/B/C (e.g., all have similar taste in media content) joined via the DBCS.

The MDSC users can discover other people via the DBCS Network because every DBCS user is logically connected via the DBCS servers. When people are online at the same time, the DBCS can enable a first user to connect with other users that are watching the same show as the first user. Users can also pick a person on the DBCS Network and see what show(s) he/she watches. The DBCS enables two-way communication between users on the DBCS Networks.

The MDSC users can also discover other people via third party social networks. The DBCS couples or connects an DBCS user to the third party social networks (e.g., Facebook, Twitter, etc.) of which the user is a member. The couplings between the DBCS and the third party social networks make available to the user his/her social contacts in those networks, and two-way communication is enabled between the user and any person on the third party social networks.

The DBCS users who are connected via the DBCS Network and/or third party social networks, by virtue of the DBCS, can recommend shows to each other, discover like-minded users on the network and watch the same shows that they might be watching, discover users who are watching the same show and become friends, discuss shows live while the shows are in progress, and join a group of users with similar taste in media content.

Figure 18:
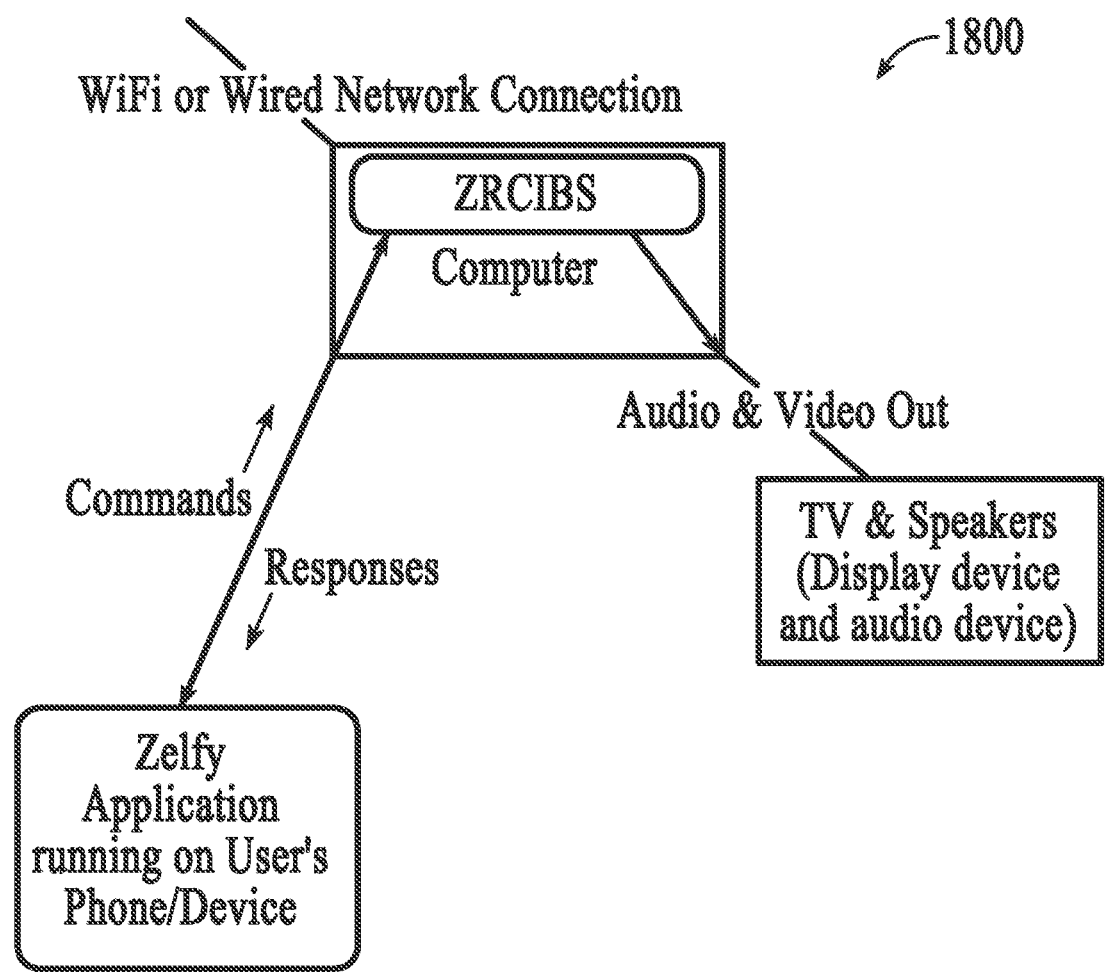
FIG. 18 is a block diagram of a home network comprising the IED along with a computer hosting the RCIBS, under an embodiment.

The DBCS of an embodiment comprises remote-controlled internet browser software (RCIBS). The RCIBS is a remote controllable internet browser optimized for internet-media consumption. FIG. 18 is a block diagram 1800 of a home network comprising a computer hosting the RCIBS and the IED, under an embodiment. The RCIBS is deployed on a computer that has video, audio and internet capabilities and is connected to the home network of the user. The IED hosting the DBCS module 101 is also coupled to the home network. The IED transmits commands to the RCIBS and receives responses from the RCIBS; the commands are received and executed by RCIBS. FIG. 19 is a table of commands generated by the IED and the resulting action or operation by the RCIBS in response to the command, under an embodiment.

Figure 21:
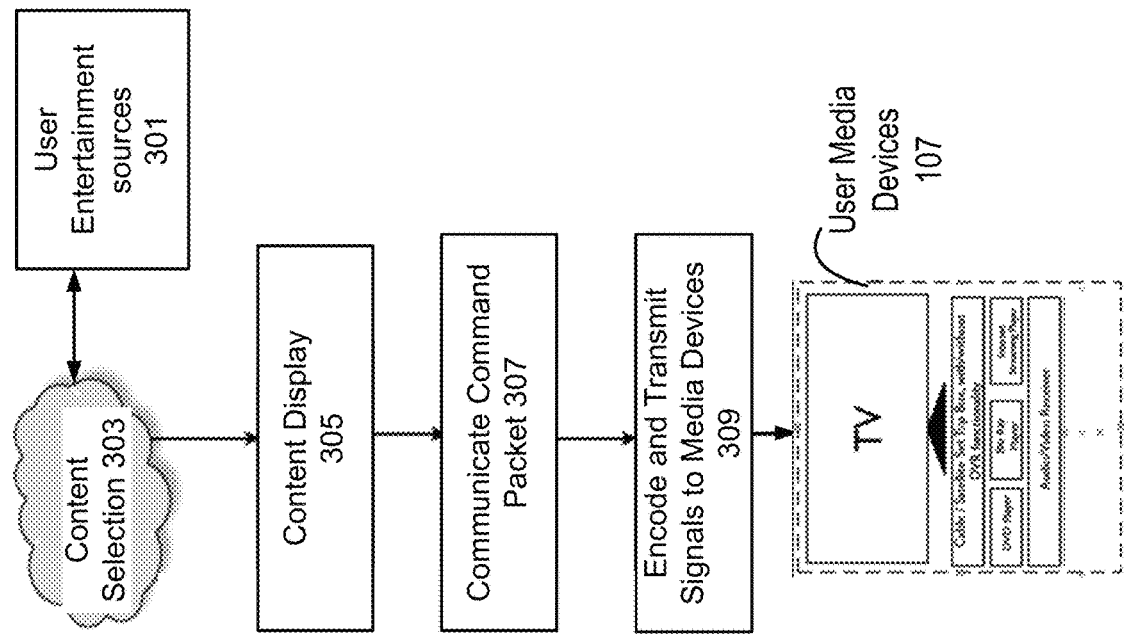
FIG. 21 illustrates an example flow chart of IED and DBCS functionality according to one embodiment.

Referring to FIG. 21, in a specific example, the DBCS coordinates the payback of media content items across disparate sources available. The DBCS provides a content selection 303 based on the entertainment device source 301 at the user premise to the IED. The content selection 303 may be determined based on interactions of the user with content at the user premise through monitoring of the state of the user media device 107 and interactions of the user with the content display 303 provided by the IED. Along with the content selections 303 received at the IED, the IED may receive commands associated with providing each media content choice in the selection 303 from a combination of the user media devices 107.

In another embodiment, the IED may store the commands associated with each user media device 107 and determine a command packet for the user media devices 107 to present the content choice. The user in turn may select a content choice within the content display 305 to communicate an associated command packer 307 to the appropriate user media devices 107.

The command packed 307 facilitates communication through the interfaces of the IED such as, but not limited to, WiFi/IP, BT and the IR enabling system to encode and transmit signals 309 to the user media devices 107. The interface of the IED may receive a single protocol based command packet (e.g., IR only, or BT only or IP only) or a multi protocol based command packet (e.g., IR+IP or IR+BT+IP or BT+IP or IR+BT). The commands in the command packet contain information that identifies the protocol over which the command should be executed to control the appropriate media device 107. The IED executes the commands in the command packet using the indicated protocol (IR, BT or IP) to encode and transmit 309 to the user media device 107. For example, a DBCS module 101 of the IED may interface with the IR Enabling System (IRES) using an interface including the host/OS and drivers. Once the IRES receives the commands, it executes it by encoding and sending 309 out the IR signal. IP and other communications may be handles in a similar fashion.

In turn, the media devices 107 process the signals 309 to present the media content choice to the user.

In some embodiments, the IRES can also be used to capture an IR signal from a regular remote control. This is captured by an IR sensor that creates electrical signals in response to an IR signal. These electrical signals are then captured and converted to a data format by the DBCS module 101 on the IED. This data may be stored locally and/or sent back to the DBCS server 1. The DBCS server 1 may utilize the received data to identify the entire command set for the media device 107 associated with the remote control. In turn, the command set may be provided to the IED or utilized to determine commands at the DBCS server 1.

Figure 24:
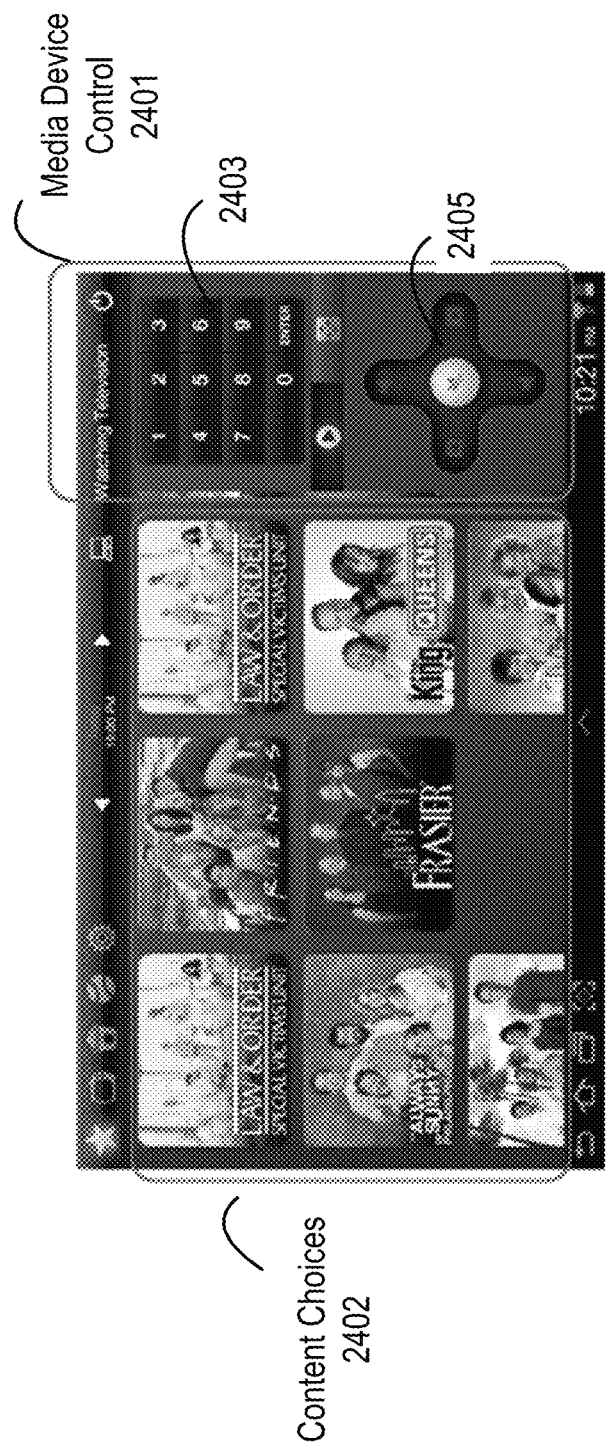

In one embodiment, the DBCS module 101 generates a media device control pane to control one or more of the media sources 107 being used to playback the user's content selection. FIG. 24 illustrates and example of a user interface with user content choices 2402 displayed with a media control 2401 for a television and home theater system. Keypad touch controls 2403 may be provided for the user to browse through television channels while audio controls may be used to control the volume of another source such as the receiver of a home theater system that processes the sound from the television programming. Thus, the media control pane 2401 may combine functions from multiple media devices 107 based on their current state for presenting the user's content choice. When the user selects a content choice 2402 corresponding to another source, such as a streaming source, the keypad controls 2403 may be replaced with a search function and keyboard for browsing through online content.

Embodiments described herein comprise a system including a media control network coupled to the internet via a local network of a premise. The system of an embodiment includes a media management application running on an internet-enabled device (IED) and controlling media devices at the premise via the media control network. The system of an embodiment includes a content recommendation system (CRS) coupled to the media management application, wherein the CRS learns media preferences from user behavior, generates from a plurality of disparate media sources media choices corresponding to the media preferences, and presents the media choices on the IED, wherein the media management application automatically controls delivery of selected media content and selects and controls the media devices that deliver the selected media content according to a media type of the selected media content.

Embodiments described herein comprise a system including a media control network at a premise, the media control network coupled to a local network of the premise and to a public network. The system of an embodiment includes a media management application running on an internet-enabled device (IED) and coupled to the media control network, wherein the media management application controls a plurality of media devices at the premise. The system of an embodiment includes a content recommendation system (CRS) coupled to the media management application, wherein the CRS receives and aggregates media content from a plurality of media sources that are disparate sources, learns media preferences from user behavior, generates from the aggregated media content media content choices corresponding to the media preferences, and presents the media content choices on the IED via the media management application, wherein, in response to a user selection on the IED of selected media content, the media management application automatically controls delivery of the selected media content and selects and controls the media devices needed to deliver the selected media content according to a media type of the selected media content.

The IED of an embodiment includes a smartphone.

The IED of an embodiment includes a tablet computer.

The media management application of an embodiment generates and presents via the IED contextual media device controls according to a media type of the selected media content, wherein the media device controls are enabled through at least one of gestures on a touchscreen of the IED and gestures made with the IED.

The system of an embodiment comprises a first social network formed via couplings between the media management application of the user and at least one other media management application of at least one other user, wherein the at least one other user has a IED that includes the at least one other media management application.

The system of an embodiment comprises a second social network formed via a coupling between the media management application and a third party social network, wherein access to a plurality of social contacts of the user on the third party social network are available to the user via the media management component and the IED.

The CRS of an embodiment learns the media preferences from a viewing history of the user.

The CRS of an embodiment learns the media preferences from a viewing history of at least one other user like the user.

The CRS of an embodiment learns the media preferences from a viewing history of at least one other user that watched at least one of identical media content and similar media content to that viewed by the user.

The CRS of an embodiment learns the media preferences from a succeeding viewing history of the at least one other user after the at least one other user watched specified media content.

The CRS of an embodiment learns the media preferences from a preceding viewing history of the at least one other user before the at least one other user watched specified media content.

The CRS of an embodiment learns the media preferences from all media content available to the user at a current time.

The CRS of an embodiment learns the media preferences from at least one of viewing history of the user, viewing history of at least one other user like the user, viewing history of at least one other user that watched at least one of identical media content and similar media content to that viewed by the user, succeeding viewing history of the at least one other user after the at least one other user watched specified media content, preceding viewing history of the at least one other user before the at least one other user watched specified media content, and all media content available to the user at a current time.

The media preferences of an embodiment comprise a language preference.

The media preferences of an embodiment comprise a media quality preference.

The media preferences of an embodiment comprise a genre preference.

The media preferences of an embodiment comprise a channel preference.

The media preferences of an embodiment comprise a source preference.

The media preferences of an embodiment comprise at least one of a language preference, a media quality preference, a genre preference, a channel preference, and a source preference.

The CRS of an embodiment controls the presentation of the media content choices on the IED to include a "Top Picks" page of recommendations instead of a search page.

The CRS of an embodiment controls the presentation of the media content choices on the IED to include content ordered by genre.

The CRS of an embodiment controls the presentation of the media content choices on the IED to include content ordered according to a probability the user will select the media content.

The CRS of an embodiment controls the presentation of the media content choices on the IED to include all media content that is viewable.

The media control network of an embodiment comprises a hub coupled to the local network of the premise and to the public network.

The media control network of an embodiment comprises at least one node, wherein a number of nodes at the premise corresponds to a number of televisions at the premise, wherein the at least one node is registered with the hub and receives commands from the hub via a wireless coupling.

The at least one node of an embodiment receives radio frequency (RF) commands from the hub, translates the RF commands into infrared signals (IR) that correspond to the selected media devices needed to deliver the selected media content.

The system of an embodiment comprises an infrared (IR) database that includes a plurality of IR codes corresponding to the plurality of media devices, wherein the at least one node uses the IR codes for the translation of the RF commands into IR signals.

Each IR code of an embodiment is maintained in a universal control (UES) format, the UES format representing a frequency and mark-space timing of IR pulses as a series of numbers.

The system of an embodiment comprises internet-based or network-based distribution of IR codes, wherein each IR code is maintained in an uncompressed universal control (UES) format. The UES format represents a frequency and mark-space timing of IR pulses as a series of numbers.

The system of an embodiment comprises a device map database that is a logical representation of the plurality of media devices at the premise and a coupling between the plurality of media devices.

The system of an embodiment comprises a remote-controlled internet browser (RCIB) running on a device coupled to the local network, wherein the media management application communicates with and controls the RCIB.

Embodiments described herein comprise a computing method running on a processor, the method coupling a media control network to the internet via a local network of a premise. The method of an embodiment includes controlling media devices at the premise via a media management application running on an internet-enabled device (IED) and the media control network. The method of an embodiment comprises learning media preferences from user behavior. The method of an embodiment comprises generating from a plurality of disparate media sources media choices corresponding to the media preferences. The method of an embodiment comprises presenting the media choices on the IED. The method of an embodiment comprises automatically controlling delivery of selected media content and selecting and controlling the media devices that deliver the selected media content according to a media type of the selected media content.

The method of an embodiment comprises generating and presenting via the IED contextual media device controls according to a media type of the selected media content, wherein the media device controls are enabled through at least one of gestures on a touchscreen of the IED and gestures made with the IED.

The method of an embodiment comprises forming a first social network via couplings between the media management application of the user and at least one other media management application of at least one other user, wherein the at least one other user has a IED that includes the at least one other media management application.

The method of an embodiment comprises forming a second social network via a couplings between the media management application and a third party social network, wherein access to a plurality of social contacts of the user on the third party social network are available to the user via the media management component and the IED.

The method of an embodiment comprises learning the media preferences from at least one of viewing history of the user, viewing history of at least one other user like the user, viewing history of at least one other user that watched at least one of identical media content and similar media content to that viewed by the user, succeeding viewing history of the at least one other user after the at least one other user watched specified media content, preceding viewing history of the at least one other user before the at least one other user watched specified media content, and all media content available to the user at a current time.

The method of an embodiment comprises controlling the presentation of the media content choices on the IED to include a "Top Picks" page of recommendations instead of a search page.

The method of an embodiment comprises controlling the presentation of the media content choices on the IED to include content ordered by genre.

The method of an embodiment comprises controlling the presentation of the media content choices on the IED to include content ordered according to a probability the user will select the media content.

The method of an embodiment comprises controlling the presentation of the media content choices on the IED to include all media content that is viewable.

The method of an embodiment comprises providing a node for each television at the premise.

The method of an embodiment comprises registering each node with the hub.

The method of an embodiment comprises receiving radio frequency (RF) commands from the hub, and translating the RF commands into infrared signals (IR) that correspond to the selected media devices needed to deliver the selected media content.

The method of an embodiment comprises providing an infrared (IR) database that includes a plurality of IR codes corresponding to the plurality of media devices.

The method of an embodiment comprises maintaining each IR code in a universal control (UES) format, the UES format representing a frequency and mark-space timing of IR pulses as a series of numbers.

The method of an embodiment comprises distributing the IR codes via the internet, wherein each IR code is maintained in an uncompressed universal control (UES) format. The UES format represents a frequency and mark-space timing of IR pulses as a series of numbers.

The method of an embodiment comprises generating and maintaining a device map database that is a logical representation of the plurality of media devices at the premise and a coupling between the plurality of media devices.

The method of an embodiment comprises accessing a public network via the IED using a remote-controlled internet browser (RCIB) running on a device coupled to the local network.

In addition to premise media content navigation and control, the DBCS can generally be used for premise automation and control. The zHub and zNode communicate with each other using a general purpose radio that is compatible with other communication protocols and devices (e.g., Zigbee, etc.), so the IED can therefore be used to control other devices in the home, for example, home appliances, lamps, refrigerators to name a few.

The DBCS of an embodiment enables a payment platform on the IED. The payment platform includes an integrated payment system within the remote control from which payments can be made to purchase media content or other items and/or services. For example, users can watch a movie and then purchase the DVD of that movie from the IED. As another example, users can pay for services from the IED (e.g., Netflix, Cinema Now, Amazon Video On Demand, etc.).

The DBCS of an embodiment enables a surrounding environment-aware entertainment experience optimization using sensors coupled or connected to the DBCS components. For example, sensors in the area or environment in which media are consumed measure parameters or characteristics of the environment (e.g., noise, temperature, lighting, etc.). Depending on the measured parameters, the media devices (e.g., TV, home theater, etc.) can be adjusted (e.g., volume, brightness, etc.) in order to optimize the surrounding environment for the entertainment experience.

The DBCS of an embodiment enables control via the IED of other radio-controlled devices at the premise. Some combination of the DBCS components of an embodiment (e.g., IED, zNode, zHub, etc.) comprise software and a hardware that listen on WiFi and transmit radio signals in the frequency of a remote-controlled or radio-controlled device. The MDSC maps the user command received via the IED to WiFi signals that are communicated to the hardware. The hardware converts the WiFi signals to radio signals corresponding to the radio-controlled device.

The DBCS of an embodiment enables a messaging platform for remote controls that supports two way communication (e.g., system to user and user to system communication). A third party with authorization can send messages to all remote controls, a specific group of remote controls, and/or a specific remote control located in the premise. The messages can be one or more of multimedia messages, alerts, information, questions, and/or advertisements, to name a few. The messages can include, for example, interaction screens with which the user can communicate in real time with the system transmitting the message.

The DBCS of an embodiment enables browsing web-based merchant stores on TV. The DBCS also enables purchases from web-based merchants via the TV.

The DBCS of an embodiment enables the dynamic presentation of advertisements on the IED. The advertisements include stand alone advertisements as well as companion advertisements that appear and play in synchronization with an advertisement currently displayed on the user's TV. The advertisements can be actionable in that they enable the user to enroll in a service, buy a product or service, and/or request/receive additional information.

The DBCS of an embodiment enables the user to preview media content on the IED before he/she watches the content on TV.

The DBCS of an embodiment enables via the IED smart "age ratings" management by enabling the IED as a smart remote control that automatically knows what show ratings (e.g., G, PG, PG-13, R, NC-17, etc.) are safe for viewing by people of a particular age group. Depending on the age on the user profile, the DBCS automatically hides or presents content. The IED of an embodiment includes multiple user profiles, and controls display of the media content based on the identity of the individual currently using the IED.

The DBCS of an embodiment enables remote control analytics by gathering data on user behavior in entertainment consumption, live audience measurement, live advertisement measurement, and geographical and demographical targeting.

The DBCS of an embodiment enables a cloud-based personal media controller and on-demand media delivery system. The DBCS enables users to watch live programming and store a copy of content being watched to their account on the DBCS. The DBCS enables users to schedule recordings like a DVR, but instead of recording the show to a hardware device in the user's home, the recording is stored in the users account on the DBCS. Thus, consumers can use the DBCS as their virtual DVR or virtual personal video recorder.

The DBCS of an embodiment enables a user to schedule alerts/alarms in their IED. When a scheduled program starts, the users are reminded of it by alerts/alarms in the IED. Users can also choose to receive a reminder some period of time before start of the show. The alert/alarm times can be adjusted at will by the user. If the user is away from the premise and cannot watch the show, he can choose to perform a remote recording of the show, using his IED.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The DBCS can be a component of a single system, multiple systems, and/or geographically separate systems. The DBCS can also be a subcomponent or subsystem of a single system, multiple systems, and/or geographically separate systems. The DBCS can be coupled to one or more other components (not shown) of a host system or a system coupled to the host system.

Summary

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting.

What is claimed is:
1. An internet-enabled device (IED) comprising:
at least one processing unit; and
a memory storing instructions, the instructions when executed by the processing unit causes the processing unit to:

determine a configuration of a plurality of media devices at a premise of a user, the media devices having a number of disparate available media sources for retrieving content;

monitor a current state of each of the plurality of media devices;

receive a selection of media content recommendations, each media content recommendation available from one of the disparate available media sources and wherein one or more of the media content recommendations are determined based in part on connections of a profile of the user in a social network;

receive social media information corresponding to the one or more of the media content recommendation, the social media information corresponding to a given media content recommendation describing the connection between the profile of the user and the given media content recommendation by identifying one or more profiles of other users within the social network having interacted with the given media content recommendation;

display the selection of media content recommendations and, for each of the one or more of the media content recommendations having corresponding social media information, display the one or more profiles of the other users having interacted with the media content recommendation in association with the media content recommendation;

determine, in response to a selection of a target media content recommendation, a command packet based on the current state of each of the plurality of media devices and the configuration of the plurality of media devices, the command packet for the target media content recommendation comprising a sequence of commands for configuring two or more of the plurality of media devices from their current states to final states for presenting the target media content recommendation, and the command packet including one or more of radio frequency (RF) commands and infrared signals (IR) that correspond to the two or more media devices to configure the two or more of the plurality of media devices to present a selected media content recommendation; and transmit, in response to executing the command packet, a signal for each command in the sequence of commands, each signal transmitted according to the sequence to commands to configure the two or more media devices to the final states to present the target media content recommendation to the user.

2. The IED of claim 1, wherein the IED is a smartphone.

3. The IED of claim 1, wherein the memory further stores instructions that when executed by the processing unit causes the processing unit to present a media device control pane comprising at least one function corresponding to each of said two or more media devices.

4. The IED of claim 1, wherein the selection of media content recommendations are determined based in part on monitored interactions of the user with a previous selection of content recommendations.

5. The IED of claim 1, wherein the selection of media content recommendations are determined based in part on monitored interactions of the user with a previous selection of similar content recommendations.

6. The IED of claim 1, wherein the selection of media content recommendations is further determined based in part on monitored interactions of other users with the content recommendations.

7. The IED of claim 1, wherein the IED is a tablet computer.

8. The IED of claim 1, wherein the social media information identifying the one or more profiles of other users within the social network having interacted with the given media content recommendation indicates a relationship with the social network between the profile of the user and the one or more profiles of other users and the interaction of the one or more profiles with the given media content recommendation.

9. The IED of claim 1, wherein an interaction of the one or more profiles of other users with the given media content recommendation is selected from watched or recommended the given media content recommendation.

10. A content recommendation system comprising:
at least one processing unit; and
a memory storing instructions, the instruction when executed by the processing unit causes the processing unit to:
determine a configuration of a plurality of media devices at a premise of a user, the media devices having a number of disparate available media sources for retrieving content;
receive a current state for each of the plurality of media devices;
determine a selection of media content recommendations, each media content recommendation available from one of the disparate available media sources and wherein one or more of the media content recommendations are determined based in part on connections of a profile of the user in a social network;
determine social media information corresponding to the one or more of the media content recommendation, the social media information corresponding to a given media content recommendation describing the connection between the profile of the user and the given media content recommendation by identifying one or more profiles of other users within the social network having interacted with the given media content recommendation;
determine, for each media content recommendation, a corresponding command packet based on the current state of each of the plurality of media devices and the configuration of the plurality of media devices, the corresponding command packet for a given media content recommendation comprising a sequence of commands for configuring two or more of the plurality of media devices from their current states to final states such that when the command packet is executed the sequence of commands configures the two or more media devices to the final states to present the given media content recommendation at the premise of the user, and wherein the command packet includes one or more of radio frequency (RF) commands and infrared signals (IR) that correspond to the two or more media devices to configure the two or more media device of the plurality of media devices to present a selected media content recommendation; and
transmit the selection of media content recommendations with the corresponding command packets and, for each of the one or more of the media content recommendations having corresponding social media information, transmit the social media information identifying the one or more profiles of the other users having interacted with the media content recommendation in association with the media content recommendation.

11. The system of claim 10, wherein the commands are executed at an internet enabled device (IED) at the premise of the user, the internet enabled device coupled to the content recommendation system and is a smartphone.

12. The system of claim 11, wherein the memory further comprises instructions that when executed by the processing unit causes the processing unit to present a media device control pane comprising at least one function corresponding to each of said two or more media devices, the content recommendation system determining a set of commands associated with the said media device.

13. The system of claim 10, wherein the selection of media content recommendations are determined based in part on monitored interactions of the user with a previous selection of content recommendations.

14. The system of claim 10, wherein the selection of media content recommendations are determined based in part on monitored interactions of the user with a previous selection of similar content recommendations.

15. The system of claim 10, wherein the selection of media content recommendations is further determined based in part on monitored interactions of other users with the content recommendations.

16. The system of claim 10, wherein the commands are executed at an internet enabled device at the premise of the user, the internet enabled device coupled to the content recommendation system and is a tablet computer.

17. The system of claim 10, wherein the social media information identifying the one or more profiles of other users within the social network having interacted with the given media content recommendation indicates a relationship with the social network between the profile of the user and the one or more profiles of other users and the interaction of the one or more profiles with the given media content recommendation.

18. The system of claim 10, wherein an interaction of the one or more profiles of other users with the given media content recommendation is selected from watched or recommended the given media content recommendation.

* * * * *